US009594831B2

(12) United States Patent
Wang et al.

(10) Patent No.: US 9,594,831 B2
(45) Date of Patent: Mar. 14, 2017

(54) TARGETED DISAMBIGUATION OF NAMED ENTITIES

(75) Inventors: Chi Wang, Bellevue, WA (US); Kaushik Chakrabarti, Redmond, WA (US); Tao Cheng, Redmond, WA (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/531,493

(22) Filed: Jun. 22, 2012

(65) Prior Publication Data

US 2013/0346421 A1 Dec. 26, 2013

(51) Int. Cl.
G06F 17/30 (2006.01)
G06F 17/27 (2006.01)

(52) U.S. Cl.
CPC ...... *G06F 17/30687* (2013.01); *G06F 17/278* (2013.01)

(58) Field of Classification Search
None
See application file for complete search history.

(56) References Cited

U.S. PATENT DOCUMENTS

| | | |
|---|---|---|
| 5,297,039 A | 3/1994 | Kanaegami et al. |
| 5,418,948 A | 5/1995 | Turtle |
| 5,469,355 A | 11/1995 | Tsuzuki |
| 5,717,913 A | 2/1998 | Driscoll |
| 5,805,911 A | 9/1998 | Miller |
| 5,926,808 A | 7/1999 | Evans et al. |
| 5,995,920 A | 11/1999 | Carbonell et al. |
| 6,006,225 A | 12/1999 | Bowman et al. |

(Continued)

FOREIGN PATENT DOCUMENTS

| | | |
|---|---|---|
| CN | 101256462 B | 9/2008 |
| CN | 101354707 A | 1/2009 |

(Continued)

OTHER PUBLICATIONS

Gentile, et al., "Graph-based Semantic Relatedness for Named Entity Disambiguation," retrieved at <<http://staffwww.dcs.shef.ac.uk/people/J.Iria/iria_s3t09.pdf>>, Proceedings of the 1st International Conference on Software, Services and Semantic Technologies (S3T), Oct. 2009, 8 pages.

(Continued)

*Primary Examiner* — Jay Morrison
(74) *Attorney, Agent, or Firm* — Julie Kane Akhter; Tom Wong; Micky Minhas

(57) ABSTRACT

A targeted disambiguation system is described herein which determines true mentions of a list of named entities in a collection of documents. The list of named entities is homogenous in the sense that the entities pertain to the same subject matter domain. The system determines the true mentions by leveraging the homogeneity in the list, and, more specifically by applying a context similarity hypothesis, a co-mention hypothesis, and an interdependency hypothesis. In one implementation, the system executes its analysis using a graph-based model. The system can operate without the existence of additional information regarding the entities in the list; nevertheless, if such information is available, the system can integrate it into its analysis.

20 Claims, 9 Drawing Sheets

(56) References Cited

U.S. PATENT DOCUMENTS

| | | | |
|---|---|---|---|
| 6,012,055 A | 1/2000 | Campbell et al. | |
| 6,098,034 A | 8/2000 | Razin et al. | |
| 6,128,613 A | 10/2000 | Wong et al. | |
| 6,137,911 A | 10/2000 | Zhilyaev | |
| 6,269,368 B1 | 7/2001 | Diamond | |
| 6,278,967 B1 | 8/2001 | Akers | |
| 6,289,301 B1 | 9/2001 | Higginbotham et al. | |
| 6,363,377 B1 | 3/2002 | Kravets et al. | |
| 6,370,527 B1 | 4/2002 | Singhal | |
| 6,377,945 B1 | 4/2002 | Risvik | |
| 6,510,406 B1 | 1/2003 | Marchisio | |
| 6,571,240 B1 | 5/2003 | Ho et al. | |
| 6,675,159 B1 | 1/2004 | Lin et al. | |
| 6,697,818 B2 | 2/2004 | Li et al. | |
| 6,711,577 B1 | 3/2004 | Wong et al. | |
| 6,804,677 B2 | 10/2004 | Shadmon et al. | |
| 6,876,963 B1 | 4/2005 | Miyahira et al. | |
| 7,024,624 B2 | 4/2006 | Hintz | |
| 7,080,068 B2 | 7/2006 | Leitermann | |
| 7,149,746 B2 | 12/2006 | Fagin et al. | |
| 7,254,530 B2 | 8/2007 | Klavans et al. | |
| 7,254,774 B2 | 8/2007 | Cucerzan et al. | |
| 7,293,003 B2 | 11/2007 | Horton | |
| 7,296,011 B2 | 11/2007 | Chaudhuri et al. | |
| 7,330,811 B2 | 2/2008 | Turcato et al. | |
| 7,340,466 B2 | 3/2008 | Odom et al. | |
| 7,346,490 B2 | 3/2008 | Fass et al. | |
| 7,440,941 B1 | 10/2008 | Borkovsky et al. | |
| 7,483,829 B2 | 1/2009 | Murakami et al. | |
| 7,526,425 B2 | 4/2009 | Marchisio et al. | |
| 7,552,112 B2 | 6/2009 | Jhala et al. | |
| 7,617,202 B2 | 11/2009 | Brill et al. | |
| 7,627,548 B2 | 12/2009 | Riley et al. | |
| 7,634,462 B2 | 12/2009 | Weyand et al. | |
| 7,636,714 B1 | 12/2009 | Lamping et al. | |
| 7,707,047 B2 | 4/2010 | Hasan et al. | |
| 7,778,816 B2 | 8/2010 | Reynar | |
| 7,778,817 B1 | 8/2010 | Liu et al. | |
| 7,809,548 B2 | 10/2010 | Mihalcea et al. | |
| 7,860,853 B2 | 12/2010 | Ren et al. | |
| 7,877,343 B2 | 1/2011 | Cafarella et al. | |
| 7,890,521 B1 | 2/2011 | Grushetskyy et al. | |
| 7,890,526 B1 | 2/2011 | Brewer et al. | |
| 7,917,355 B2 | 3/2011 | Wu et al. | |
| 7,925,610 B2 | 4/2011 | Elbaz | |
| 7,958,489 B2 | 6/2011 | Meijer et al. | |
| 8,239,751 B1 | 8/2012 | Rochelle et al. | |
| 8,332,333 B2* | 12/2012 | Agarwal | 706/12 |
| 8,417,713 B1 | 4/2013 | Blair-Goldensohn et al. | |
| 8,429,099 B1* | 4/2013 | Perkowitz et al. | 706/12 |
| 8,577,907 B1 | 11/2013 | Singhal et al. | |
| 8,996,356 B1 | 3/2015 | Yang et al. | |
| 2001/0042080 A1 | 11/2001 | Ross | |
| 2002/0103793 A1 | 8/2002 | Koller et al. | |
| 2002/0123882 A1 | 9/2002 | Mohammed | |
| 2002/0169755 A1 | 11/2002 | Framroze et al. | |
| 2002/0178005 A1 | 11/2002 | Dusan | |
| 2002/0198909 A1 | 12/2002 | Huynh et al. | |
| 2003/0004716 A1 | 1/2003 | Haigh et al. | |
| 2003/0033288 A1 | 2/2003 | Shanahan et al. | |
| 2003/0120651 A1 | 6/2003 | Bernstein et al. | |
| 2003/0195877 A1 | 10/2003 | Ford et al. | |
| 2004/0254920 A1 | 12/2004 | Brill et al. | |
| 2005/0021324 A1 | 1/2005 | Brants et al. | |
| 2005/0060312 A1 | 3/2005 | Curtiss et al. | |
| 2005/0060337 A1 | 3/2005 | Chou et al. | |
| 2005/0060643 A1 | 3/2005 | Glass et al. | |
| 2005/0080613 A1 | 4/2005 | Colledge et al. | |
| 2005/0086592 A1 | 4/2005 | Polanyi et al. | |
| 2005/0108195 A1 | 5/2005 | Yalovsky et al. | |
| 2005/0114322 A1 | 5/2005 | Melman | |
| 2005/0149494 A1 | 7/2005 | Lindh et al. | |
| 2005/0216443 A1 | 9/2005 | Morton et al. | |
| 2005/0216444 A1 | 9/2005 | Ritter et al. | |
| 2006/0026128 A1 | 2/2006 | Bier | |
| 2006/0031207 A1 | 2/2006 | Bjarnestam et al. | |
| 2006/0069589 A1 | 3/2006 | Nigam et al. | |
| 2006/0088356 A1 | 4/2006 | Jawerth et al. | |
| 2006/0089927 A1 | 4/2006 | Bandyopadhyay et al. | |
| 2006/0136405 A1* | 6/2006 | Ducatel et al. | 707/4 |
| 2006/0173674 A1 | 8/2006 | Nakajima et al. | |
| 2006/0195421 A1 | 8/2006 | Kilroy | |
| 2006/0206306 A1 | 9/2006 | Cao et al. | |
| 2006/0218136 A1 | 9/2006 | Surakka et al. | |
| 2006/0253427 A1 | 11/2006 | Wu et al. | |
| 2006/0271353 A1 | 11/2006 | Berkan | |
| 2007/0011154 A1 | 1/2007 | Musgrove et al. | |
| 2007/0011183 A1 | 1/2007 | Langseth et al. | |
| 2007/0038663 A1 | 2/2007 | Colando | |
| 2007/0043723 A1 | 2/2007 | Bitan et al. | |
| 2007/0060114 A1 | 3/2007 | Ramer et al. | |
| 2007/0073745 A1 | 3/2007 | Scott et al. | |
| 2007/0083359 A1 | 4/2007 | Bender | |
| 2007/0094285 A1 | 4/2007 | Agichtein et al. | |
| 2007/0100806 A1 | 5/2007 | Ramer et al. | |
| 2007/0100823 A1 | 5/2007 | Inmon | |
| 2007/0192085 A1 | 8/2007 | Roulland et al. | |
| 2007/0203929 A1 | 8/2007 | Bolivar | |
| 2007/0233656 A1 | 10/2007 | Bunescu et al. | |
| 2007/0239742 A1 | 10/2007 | Saha et al. | |
| 2008/0016040 A1 | 1/2008 | Jones et al. | |
| 2008/0021898 A1 | 1/2008 | Hoglund | |
| 2008/0077570 A1 | 3/2008 | Tang et al. | |
| 2008/0087725 A1 | 4/2008 | Liu | |
| 2008/0091660 A1 | 4/2008 | Jang et al. | |
| 2008/0097941 A1* | 4/2008 | Agarwal | 706/12 |
| 2008/0109416 A1 | 5/2008 | Williams | |
| 2008/0147618 A1 | 6/2008 | Bauche | |
| 2008/0154873 A1 | 6/2008 | Redlich et al. | |
| 2008/0171555 A1 | 7/2008 | Oh | |
| 2008/0195601 A1* | 8/2008 | Ntoulas et al. | 707/5 |
| 2008/0266148 A1 | 10/2008 | Chen | |
| 2008/0270116 A1 | 10/2008 | Godbole et al. | |
| 2008/0270120 A1 | 10/2008 | Pestian | |
| 2008/0275694 A1 | 11/2008 | Varone | |
| 2008/0275837 A1 | 11/2008 | Lambov | |
| 2008/0313607 A1 | 12/2008 | Yutaka et al. | |
| 2009/0044095 A1 | 2/2009 | Berger et al. | |
| 2009/0144609 A1 | 6/2009 | Liang et al. | |
| 2009/0222434 A1 | 9/2009 | Fothergill | |
| 2009/0281970 A1 | 11/2009 | Mika et al. | |
| 2009/0282012 A1* | 11/2009 | Konig et al. | 707/5 |
| 2009/0319500 A1 | 12/2009 | Agrawal et al. | |
| 2009/0327223 A1 | 12/2009 | Chakrabarti et al. | |
| 2010/0004925 A1 | 1/2010 | Ah-Pine et al. | |
| 2010/0005086 A1 | 1/2010 | Wang et al. | |
| 2010/0082657 A1 | 4/2010 | Paparizos et al. | |
| 2010/0106677 A1 | 4/2010 | Yu | |
| 2010/0121702 A1* | 5/2010 | Steelberg et al. | 705/14.41 |
| 2010/0250598 A1 | 9/2010 | Brauer et al. | |
| 2010/0293179 A1 | 11/2010 | Chaudhuri et al. | |
| 2010/0313258 A1 | 12/2010 | Chaudhuri et al. | |
| 2010/0332217 A1 | 12/2010 | Wintner et al. | |
| 2011/0029513 A1* | 2/2011 | Morris | 707/728 |
| 2011/0071965 A1 | 3/2011 | Long et al. | |
| 2011/0093479 A1 | 4/2011 | Fuchs | |
| 2011/0106807 A1 | 5/2011 | Srihari et al. | |
| 2011/0125776 A1 | 5/2011 | Roshen et al. | |
| 2011/0153324 A1 | 6/2011 | Ballinger et al. | |
| 2011/0153325 A1 | 6/2011 | Ballinger et al. | |
| 2011/0161080 A1 | 6/2011 | Ballinger et al. | |
| 2011/0196670 A1 | 8/2011 | Dang et al. | |
| 2011/0202874 A1 | 8/2011 | Ramer et al. | |
| 2011/0213796 A1 | 9/2011 | Kiyota et al. | |
| 2011/0225133 A1 | 9/2011 | Manu | |
| 2011/0282856 A1 | 11/2011 | Ganti et al. | |
| 2011/0301941 A1 | 12/2011 | De Vocht | |
| 2011/0302179 A1* | 12/2011 | Agrawal | 707/754 |
| 2011/0307485 A1* | 12/2011 | Udupa et al. | 707/737 |
| 2011/0314006 A1 | 12/2011 | Sweeney | |
| 2011/0316772 A1 | 12/2011 | Zhang et al. | |
| 2011/0320548 A1 | 12/2011 | Jonsson | |
| 2012/0011115 A1 | 1/2012 | Madhavan et al. | |
| 2012/0042022 A1 | 2/2012 | Sheth et al. | |

(56) References Cited

U.S. PATENT DOCUMENTS

| | | |
|---|---|---|
| 2012/0065963 A1 | 3/2012 | Bangalore et al. |
| 2012/0117078 A1 | 5/2012 | Morton et al. |
| 2012/0150838 A1 | 6/2012 | Yin et al. |
| 2012/0166182 A1 | 6/2012 | Ko et al. |
| 2012/0191642 A1 | 7/2012 | George |
| 2012/0259890 A1 | 10/2012 | Denesuk et al. |
| 2013/0018894 A1 | 1/2013 | Qiao |
| 2013/0141259 A1 | 6/2013 | Hazarika et al. |
| 2013/0159277 A1 | 6/2013 | Liu et al. |
| 2013/0159919 A1 | 6/2013 | Leydon |
| 2013/0166573 A1 | 6/2013 | Vaitheeswaran et al. |
| 2013/0232129 A1 | 9/2013 | Cheng et al. |
| 2013/0238621 A1 | 9/2013 | Ganjam et al. |
| 2013/0246322 A1 | 9/2013 | De Sousa Webber |
| 2013/0290390 A1 | 10/2013 | Choe et al. |
| 2013/0325436 A1 | 12/2013 | Wang et al. |
| 2013/0346464 A1 | 12/2013 | Cheng et al. |
| 2014/0058722 A1 | 2/2014 | Sun et al. |
| 2015/0121290 A1 | 4/2015 | Li et al. |
| 2015/0161110 A1 | 6/2015 | Salz |
| 2015/0199332 A1 | 7/2015 | Li |
| 2016/0012036 A1 | 1/2016 | Sun et al. |

FOREIGN PATENT DOCUMENTS

| | | |
|---|---|---|
| CN | 101785000 A | 7/2010 |
| CN | 102193970 A | 9/2011 |
| CN | 102306144 A | 1/2012 |
| CN | 102314452 A | 1/2012 |
| CN | 102609407 A | 7/2012 |
| WO | 9740452 A1 | 10/1997 |
| WO | 0229627 A2 | 4/2002 |
| WO | 2006123918 A1 | 11/2006 |
| WO | 2008141583 A1 | 11/2008 |
| WO | 20130133985 A1 | 9/2013 |

OTHER PUBLICATIONS

Watanabe, et al., "A Graph-based Approach to Named Entity Categorization in Wikipedia Using Conditional Random Fields," retrieved at <<http://www.aclweb.org/anthology-new/D/D07/D07-1068.pdf>>, Proceedings of the 2007 Joint Conference on Empirical Methods in Natural Language Processing and Computational Natural Language Learning, Jun. 2007, pp. 649-657.

Mihalcea, Rada, "Unsupervised Large-Vocabulary Word Sense Disambiguation with Graph-based Algorithms for Sequence Data Labeling," retrieved at <<http://www.aclweb.org/anthology-new/H/H05/H05-1052.pdf>>, Proceedings of Human Language Technology Conference and Conference on Empirical Methods in Natural Language Processing (HLT/EMNLP), Oct. 2005, pp. 411-418.

Nadeau, et al., "Unsupervised Named-Entity Recognition: Generating Gazetteers and Resolving Ambiguity," retrieved at <<http://cogprints.org/5025/1/NRC-48727.pdf>>, Proceedings of 19th Conference of the Canadian Society for Computational Studies of Intelligence, Jun. 7, 2006, pp. 266-277.

Arasu, et al., "PageRank Computation and the Structure of the Web: Experiments and Algorithms," retrieved at <<http://www2002.org/CDROM/poster/173.pdf>>, Proceedings of the Eleventh International World Wide Web Conference, 2002, 5 pages.

Artiles, et al., "WePS-3 Evaluation Campaign: Overview of the Web People Search Clustering and Attribute Extraction Tasks," retrieved at <<http://citeseerx.ist.psu.edu/viewdoc/download?doi=10.1.1.174.3094&rep=rep1&type=pdf>>, Proceedings of CLEF, 2010, 15 pages.

Bhattacharya, et al., "Collective Entity Resolution in Relational Data," retrieved at <<http://linqs.cs.umd.edu/basilic/web/Publications/2007/bhattacharya:tkdd07/bhattacharya-tkdd.pdf>>, ACM Transactions on Knowledge Discovery from Data, vol. 1, No. 1, 2007, 35 pages.

Brin, et al., "The Anatomy of a Large-Scale Hypertextual Web Search Engine," retrieved at <<http://www.cs.panam.edu/~creilly/courses/CSCI6175-F11/papers/Brin-1998.pdf>>, Proceedings of the Seventh International Conference on World Wide Web 7, 1998, 20 pages.

Bunescu, et al., "Using Encyclopedic Knowledge for Named Entity Disambiguation," retrieved at <<http://www.cs.utexas.edu/~ml/papers/encyc-eacl-06.pdf>>, Proceeding of the 11th Conference of the European Chapter of the Association of Computational Linguistics, 2006, 8 pages.

Chakaravarthy, et al., "Efficiently Linking Text Documents with Relevant Structured Information," retrieved at <<http://www.vldb.org/conf/2006/p667-chakaravarthy.pdf>>, VLDB '06, Proceedings of the 32nd International Conference on Very Large Data Bases, 2006, pp. 667-678.

Cheng, et al., "Entity Synonyms for Structured Web Search," retrieved at <<http://ieeexplore.ieee.org/stamp/stamp.jsp?tp=&arnumber=5963679>>, IEEE Transactions on Knowledge and Data Engineering, No. 99, Jul. 2011, pp. 1-15.

Cucerzan, Silviu, "Large-Scale Named Entity Disambiguation Based on Wikipedia Data," retrieved at <<http://acl.ldc.upenn.edu/D/D07/D07-1074.pdf>>, Proceedings of the 2007 Joint Conference on Empirical Methods in Natural Language Processing and Computational Natural Language, 2007, pp. 708-716.

Dill, et al., "SemTag and Seeker: Bootstrapping the Semantic Web Via Automated Semantic Annotation," retrieved at <<http://what.csc.villanova.edu/~cassel/9010SemanticWeb/SemTag%20and%20Seeker%20Bootstrapping%20the%20semantic%20web%20via%20automated%20semantic%20annotation.pdf>>, Proceedings of the 12th International Conference on World Wide Web, 2003, 9 pages.

Gale, et al., "One Sense Per Discourse," retrieved at <<http://citeseerx.ist.psu.edu/viewdoc/download;jsessionid=8EA215CD07B134CA243A22FF6DDA2871?doi=10.1.1.178.2723&rep=rep1&type=pdf>>, Proceedings of the Workshop on Speech and Natural Language, 1992, pp. 233-237.

Gooi, et al., "Cross-Document Coreference on a Large Scale Corpus," retrieved at <<http://acl.ldc.upenn.edu/hlt-naacl2004/main/pdf/177_Paper.pdf>>, in HLT-NAACL, 2004, 8 pages.

Han, et al., "Collective Entity Linking in Web Text: A Graph-Based Method," retrieved at <<http://www.nlpr.ia.ac.cn/2011papers/gjhy/gh133.pdf>>, Proceedings of the 34th International ACM SIGIR Conference on Research and Development in Information Retrieval, Jul. 2011, pp. 765-774.

Han, et al., "Named Entity Disambiguation by Leveraging Wikipedia Semantic Knowledge," retrieved at <<http://avss2012.org/cip/ZhaoJunPublications/paper/CIKM2009.NED.pdf>>, Proceedings of the 18th ACM Conference on Information and Knowledge Management, 2009, 10 pages.

Hoffart, et al., "Robust Disambiguation of Named Entities in Text," retrieved at <<http://aclweb.org/anthology-new/D/D11/D11-1072.pdf>>, Proceedings of the 2011 Conference on Empirical Methods in Natural Language Processing, Jul. 2011, pp. 782-792.

Kulkarni, et al., "Collective Annotation of Wikipedia Entities in Web Text," retrieved at <<http://www.cc.gatech.edu/~zha/CSE8801/query-annotation/p457-kulkarni.pdf>>, Proceedings of the 15th ACM SIGKDD International Conference on Knowledge Discovery and Data mining, 2009, pp. 457-465.

Mann, et al., "Unsupervised Personal Name Disambiguation," retrieved at <<http://citeseerx.ist.psu.edu/viewdoc/download?doi=10.1.1.10.7097&rep=rep1&type=pdf>>, Proceedings of the Seventh Conference on Natural Language Learning at HLT-NAACL 2003, vol. 4, 2003, 8 pages.

Mihalcea, et al., "Wikify! Linking Documents to Encyclopedic Knowledge," retrieved at <<http://www.cse.unt.edu/~rada/papers/mihalcea.cikm07.pdf>>, Proceedings of the Sixteenth ACM Conference on Conference on Information and Knowledge Management, 2007, 9 pages.

Milne, et al., "Learning to Link with Wikipedia," retrieved at <<http://citeseerx.ist.psu.edu/viewdoc/download?doi=10.1.1.148.3617&rep=rep1&type=pdf>>, Proceedings of the 17th ACM Conference on Information and Knowledge Management, 2008, 10 pages.

(56) References Cited

OTHER PUBLICATIONS

Sarmento, et al., "An Approach to Web-scale Named-Entity Disambiguation," accessible at <<http://sigarra.up.pt/feup/publs_pesquisa.show_publ_file?pct_gdoc_id=68610.>>, Proceedings of the 6th International Conference on Machine Learning and Data Mining in Pattern Recognition, 2009, 15 pages.

"PageRank," retrieved at <<http://en.wikipedia.org/wiki/PageRank>>, Wikipedia article, retrieved on Jun. 22, 2012, 14 pages.

Wang, et al., "Targeted Disambiguation of Ad-hoc, Homogeneous Sets of Named Entities," retrieved at <<http://acm.org>>, Proceedings of the 21st International Conference on World Wide Web, Apr. 2012, pp. 719-728.

Cheng, et al., U.S. Appl. No. 13/487,260, "Robust Discovery of Entity Synonyms Using Query Logs," filed Jun. 4, 2012, 61 pages.

Chen, et al., "A Query Substitution-Search Result Refinement Approach for Long Query Web Searches," retrieved at <<http://ieeexplore.ieee.org/stamp/stamp.jsp?tp=&arnumber=5286069>>, IEEE/WIC/ACM International Joint Conferences on Web Intelligence and Intelligent Agent Technologies (WI-IAT), 2009, pp. 245-251.

Jain, et al., "Domain-Independent Entity Extraction from Web Search Query Logs," retrieved at <<http://www.marcopennacchiotti.com/pro/publications/WWVV_2011_2.pdf>>, Proceedings of the 20th International Conference Companion on World Wide Web, Mar. 28, 2011, pp. 63-64.

Chaudhuri, et al., "Robust and Efficient Fuzzy Match for Online Data Cleaning," retrieved at <<http://research.microsoft.com/pubs/75996/bm_sigmod03.pdf>>, SIGMOD '03, Proceedings of the 2003 ACM SIGMOD International Conference on Management of Data, Jun. 9, 2003, 12 pages.

Minjuan, et al., "Pseudo-Relevance Feedback Driven for XML Query Expansion," retrieved at <<http://www.aicit.org/jcit/ppl/JCIT0509_15.pdf>>, Journal of Convergence Information Technology, vol. 5, No. 9, Nov. 2010, pp. 146-156.

Isard, et al., "Dryad: Distributed Data-Parallel Programs from Sequential Building Blocks," retrieved at <<http://research.microsoft.com/pubs/63785/eurosys07.pdf>>, EuroSys 2007, 2007, 14 pages.

Jones, et al., "Generating Query Substitutions," retrieved at <<http://acm.org>>, Proceedings of the 15th International Conference on World Wide Web, 2006, pp. 387-396.

Mei, et al., "Query Suggestion Using Hitting Time," retrieved at <<http://ACM.org>>, Proceedings of the 17th ACM Conference on Information and Knowledge Management, Oct. 2008, pp. 469-477.

Navarro, Gonzalo, "A Guided Tour to Approximate String Matching," retrieved at <<http://ACM.org>>, ACM Computing Surveys, vol. 33, Issue 1, Mar. 2001, pp. 31-88.

Guo, et al., "Named Entity Recognition in Query," retrieved at <<http://acm.org>>, Proceedings of the 32nd International ACM SIGIR Conference on Research and Development in Information Retrieval, Jul. 2009, pp. 267-274.

Pantel, et al., "Web-Scale Distributional Similarity and Entity Set Expansion," retrieved at <<http://www.aclweb.org/anthology/D/D091D09-1098.pdf>>, Proceedings of the 2009 Conference on Empirical Methods in Natural Language Processing, Aug. 2009, pp. 938-947.

Sarkas, et al., "Structured Annotations of Web Queries," retrieved at <<http://acm.org>>, Proceedings of the 2010 International Conference on Management of Data, Jun. 2010, pp. 771-782.

Cheng, et al., "Fuzzy Matching of Web Queries to Structured Data," retrieved at <<http://ieeexplore.ieee.org>>, 2010 IEEE 26th International Conference on Data Engineering (ICDE), Mar. 2010, pp. 713-716.

"Foundations of Statistical Natural Language Processing," retrieved at <<http://nlp.stanford.eduifsnip/>>, retrieved on Jul. 4, 2012, companion website to the book: Foundations of Statistical Natural Language Processing, Manning, et al., MIT Press, Jun. 18, 1999, 2 pages.

Agrawal, "Mining Association Rules Between Sets of Items in Large Databases," retrieved at <<http://rakesh.agrawal-family.com/papers/sigmod93assoc.pdf>>, Proceedings of the 1993 ACM SIGMOD International Conference on Management of Data, May 1993, 10 pages.

Aho, et al., "Efficient String Matching: An Aid to Bibliographic Search," retrieved at <<http://www.win.tue.nl/~watson/2R0801opdracht/p333-aho-corasick.pdf>>, Communications of the ACM CACM, vol. 18, Issue 6, Jun. 1975, pp. 333-340.

Arasu, et al., "Efficient Exact Set-Similarity Joins," retrieved at <<http://www.vldb.org/conf/20061p918-arasu.pdf>>, Proceedings of the 32nd International Conference on Very Large Data Bases, Sep. 2006, pp. 918-929.

Argawal, et al., "Scalable Ad-hoc Entity Extraction from Text Collections," retrieved at <<http://www.cs.uwaterloo.cal~ilyas/CS848F08/papers/agrawal2008.pdf>>, Proceedings of the VLDB Endowment VLDB Endowment, vol., Issue 1, Aug. 2008 pp. 945-957.

Bohn, Christian, "Extracting Named Entities and Synonyms from Wikipedia for use in News Search," retrieved at <<http://daimidi.ntnu.no/masteroppgaver/IME/IDI/2008/4290/masteroppgave.pdf>>, Master of Science in Computer Science, Norwegian University of Science and Technology, Department of Computer and Information Science, Jun. 2008, 95 pages.

Chakrabarti, et al., "An Efficient Filter for Approximate Membership Checking," retrieved at <<http://acm.org>>, Proceedings of the 2008 ACM Sigmod International Conference on Management of Data, Jun. 2008, pp. 805-817.

Chaudhuri, et al., "A Primitive Operator for Similarity Joins in Data Cleaning," retrieved at <<http://ieeexplore.ieee.org/stamp/stamp.jsp?arnumber=1617373&isnumber=33902>>, Proceedings of the 22nd International Conference on Data Engineering (ICDE 2006), 2006, 12 pages.

Haveliwala, et al., "Topic-Sensitive Pagerank", in WWW 2002, May 7-11, 2002, Honolulu, Hawaii, 10 pages.

He, et al., "Statistical Schema Matching Across Web Query Interfaces", in SIGMOD 2003, Jun. 9-12, 2003, San Diego, CA, 12 pages.

He, et al., "Seisa: Set Expansion by Iterative Similarity Aggregation", in WWW, Mar. 28-Apr. 1, 2011, Hyderabad, India, 10 pages.

Limaye, et al., "Annotating and Searching Web Tables Using Entities, Types and Relationships", VLDB Endowment, vol. 3, No. 1, 2010, 10 pages.

Madhavan, et al., "Generic Schema Matching with Cupid", 27th VLDB Conference, 2001, Roma, Italy, 10 pages.

Page, et al., "The Pagerank Citation Ranking: Bringing Order to the Web". Technical Report, Stanford InfoLab, 1998, 17 pages.

Rahm, et al., "A Survey of Approaches to Automatic Schema Matching", the VLDB Journal, 2001, 24 pages.

Yin, et al., "Facto: A Fact Lookup Engine Based on Web Tables", in WWW, Mar. 28-Apr. 1, 2011, Hyderabad, India, 10 pages.

Banko et al., "Open Information Extraction from the Web", Commun. ACM 51, 12 (Dec. 2008), 68-74.

Urbansky et al., "Entity Extractions from the Web with WebKnox", V. Snasel et al. (Eds.): Advances in Intelligent Web Mastering—2, AISC 67, pp. 209-218.

Feldman et al., "Self-supervised Relation Extraction from the Web", F. Esposito et al. (Eds.): ISMIS 2006, LNAI 4203, pp. 755-764, 2006.

Loser et al., "Auguementing Tables by Self-Supervised Web Search", M. Castellanos, U. Dayal, and V. Markl (Eds.): BIRTE 2010, LNBIP 84, pp. 84-99, 2011.

International Search Report and Written Opinion, PCT/US2013/027203, mailed Jun. 26, 2013, 10 pages.

Non-Final Office Action of U.S. Appl. No. 12/465,832, mailed on May 23, 2011, Surajit Chaudhuri, Identifying Synonyms of Entities Using Web Search, 19 pages.

Notice of Allowance Dated Jan. 21, 2014 from U.S. Appl. No. 13/487,260, Filed Jun. 4, 2012, Inventor Tao Cheng.

Lafferty et al., "Conditional Random Fields: Probalistic Models for Segmenting and Labeling Sequence Data", Proceedings of the Eighteenth International Conference on Machine Learning, pp. 282-289, 2001.

(56) References Cited

OTHER PUBLICATIONS

Lin, Dekang, "Automatic Retrieval and Clustering of Similar Words", Proceedings of the 17th international Conference on Computational Linguistics, vol. 2, pp. 768-774, 1998.

Cohen, et al., "Learning to Match and Cluster Large High-Dimensional Data Sets for Data Integration", In Proceedings of the Eighth ACM SIGKDD International Conference on Knowledge Discovery and Data Mining, Jul. 23-26, 2002, 6 pages.

Sarawagi, Sunita, "Models and Indices for Integrating Unstructured Data with a Relational Database", In Proceedings of the Workshop on Knowledge Discovery in Inductive Databases, Sep. 20, 2004, 10 pages.

Schallehn, et al., "Efficient Similarity-based Operations for Data Integration", In Journal of Data & Knowledge Engineering, vol. 48, Issue 3, Aug. 12, 2003, 27 pages.

Berlin, et al., "TupleRank: Ranking Discovered Content in Virtual Databases", In Proceedings of 6th International Conference on Next Generation Information Technologies and Systems, Jul. 4-6, 2006, 15 pages.

Madhavan, et al., "Corpus-based Schema Matching", 21st International Conference on Data Engineering, Apr. 5-8, 2005, 12 pages.

Venetis, et al., "Recovering Semantics of Tables on the Web", Proceedings of the VLBD Endowment, vol. 4, Issue 9, Jun. 2011, 10 pages.

Ganjam, et al., " InfoGather: Entity Augmentation and Attribute Discovery by Holistic Matching with Web Tables", SIGMOD '12, May 20-24, 2012, Scottsdale AZ, 12 pages.

Bahmani, et al., "Fast Personalized Pagerank on Mapreduce", in SIGMOD, Jun. 12-16, 2011, Athens, Greece, 12 pages.

Ghani, et al., "Text Mining for Product Attribute Extraction", SIGKDD Explorations, vol. 8, Issue 1, Jun. 2006, 8 pages.

Bernstein, et al., "Generic Schema Matching, Ten Years Later". In VLBD Endowment, vol. 4, No. 11, 2011, 7 pages.

Cafarella, et al., "Data Integration for the Relational Web". VLDB, Aug. 24-28, 2009, Lyon, France, 12 pages.

Cafarella, et al., "Webtables: Exploring the Power of Tables on the Web", PVLDB, 2008, 12 pages.

Cafarella, et al., "Uncovering the Relational Web", in WebDB, Jun. 13, 2008, Vancouver, Canada, 6 pages.

Doan, et al., "Reconciling Schemas of Disparate Data Sources: A Machine-Learning Approach", in ACM Sigmod, May 21-24, 2001, 12 pages.

Elsayed, et al., "Pairwise Document Similarity in Large Collections with Mapreduce", In ACL, Jun. 2008, 4 pages.

Gupta, et al., "Answering Table Augmentation Queries from Unstructured Lists on the Web", Proc. VLDB Endowment, Aug. 24-28, 2009, Lyon France, 12 pages.

Han, et al., "Data Mining: Concepts and Techniques," retrieved on at <<http://www.iriit.edu/~dagr/DataMiningCourse/Spring2001/BookNotes/4lang.pdf>>, slide presentation, Intelligent Database Systems Research Lab, School of Computing Science, Simon Fraser University, Canada, Jun. 17, 2001, 5 pages.

Hu, Wen-Chu, "ApproxSeek: Web Document Search Using Approximate Matching," retrieved at http://citeseerx.ist.psu.edu/viewdoc/download;jsessionid=F776964F00B448D5445A84C3528F0E83?doi=10.1.1.44.8602&rep=rep1Mype=pdf>>, Proceedings of the Fifth International Conference on Computer Science and Informatics, Sep. 1999, 5 pages.

Koudas, et al., "Record Linkage: Similarity Measures and Algorithms," retrieved at <<http://disi.unitn.it/~p2p/RelatedWork/Matching/aj_recordLinkage_06.pdf>>, presentation dated Sep. 23, 2006, 130 pages.

Smeaton, et al., "Experiments on Incorporating Syntactic Processing of User Queries into a Document Retrieval Strategy," retrieved at <<http://acm.org, Proceedings of the 11th Annual International ACM SIGIR Conference on Research and Development in Information Retrieval, 1988, pp. 31-51.

Hipp, et al., "Algorithms for Association Rule Mining- A General Survey and Comparison", ACM SIGKDD Explorations Newsletter, vol. 2, Issue 1, Jun., 2000, pp. 58-64.

Pasquier. et al.. "Efficient Mining of Association Rules Using Closed Itemset Lattices". 1999 Elsevier Science Ltd., vol. 24, No. 1, pp. 25-46.

Kowalski, et al., "Information Storage and Retrieval Systems", 2002 Kluwer Academic Publishers, pp. 1-36.

Klapaftis, et al., "Google & WordNet Based Word Sense Disambiguation", Proceedings of the 22nd ICML Workshop on Learning & Extending Ontologies, Bonn, Germany, 2005, 5 pages.

Baeza-Yates, et al., "Extracting Semantic Relations from Query Logs", Yahoo! Research, KDD'07, Aug. 2007, San Jose, California, USA, 10 pages.

Chandel, et al., "Efficient Balch Top-k Search for Dictionary-based Entity Recognition", Retrieved at <<http://www.il.iilb.ac.In/-sunila/papers/icde06b.pdf>>, Proceedings of the IEEE 22nd International Conference on Data Engineering (ICDE '06), Apr. 3-7, 2006, Atlanta, Georgia, 10 pages.

Kasliwal, et al., "Text Mining in Biomedical Literature", Retrieved at <<http://www.cse.iilb.ac.ini-sourabh/seminar/ final/seminar_report>>, Retrieved at least as early as Mar. 9, 2009, Department of Computer Science and Engineering, Indian Institute of Technology, Bombay, India, 27 pages.

Graupmann. Jens. "Concept-Based Search on Semi-Structured Data Exploiting Mined Semantic Relations," accessed at <<http://www.springerlink.com/content/p7fw8dk70v2x8w4a/fulltext.pdf>>, EDBT 2004 Workshops, LNCS 3268, Eds. W. Lindner, et al., Springer-Verlag, Berlin Heidelberg, 2004, pp. 34-43.

Cohen, et al., "XSEarch: A Semantic Search Engine for XML," accessed at <<http://www.vldb.org/conf/2003/papers/S03P02.pdf>>, Proceedings of the 29th VLDB Conference, 2003, 12 pages.

Chklovski, et al., "VERBOCEAN: Mining the Web for Fine-Grained Semantic Verb Relations," accessed at <<http:l/acl.ldc.upenn.edu/ac12004/emnIp/pdf/Chklovski.pdf>>, Proceedings of EMNLP 2004, 2004, 8 pages.

Chang, et al., "Structured Databases on the Web: Observations and Implications," accessed at <<http://eagle.cs.uiuc.edu/pubs/20041dwsurvey-sigmodrecord-chIpz-aug04.pdf>>, ACM SIGMOD Record Archive, vol. 33, Issue 3, 2004, 10 pages.

Craswell, et al., "Random Walks on the Click Graph," accessed at <<http://research.microsoft.com/users/nickcil pubs/craswell_sigir07.pdf, Proceedings of the 30th Annual International ACM SIGIR Conference on Research and Development in Information Retrieval, 2007, 8 pages.

Fuxman, et al., "Using the Wisdom of the Crowds for Keyword Generation," accessed at <<http:l/ acm.org>>, Proceedings of the 17th International Conference on World Wide Web, 2008, pp. 61-70.

Malekian, et al., "Optimizing Query Rewrites for Keyword-Based Advertising," accessed at <<http:l/ acm.org>>, Proceedings of the 9th ACM Conference on Electronic Commerce, Jul. 2008, pp. 10-19.

Miller, George A., "Wordnet: A Lexical Database for English," accessed at <<http://acm.org>>, Communications of the ACM, vol. 38, No. 11, Nov., 1995, pp. 39-41.

Strube, et al., "Wikirelatel Computing Semantic Relatedness Using Wikipedia," accessed at <<http://www.dit.unitn.it/-p2p/RelatedWork!Matching/aaai06.pdf>>, AAAI'06, Proceedings of the 21st National Conference on Artificial intelligence, 2006, 6 pages.

Turney, Peter D., accessed at <<http://cogprints.org/1796/1/ECML2001.ps>>, "Mining the Web for Synonyms: PMI- IR versus LSA on TOEFL," EMCL '01, Proceedings of the 12th European Conference on Machine Learning, LNCS, vol. 2167,2001, 12 pages.

Wen, et al., "Clustering User Queries of a Search Engine," accessed at <<http://research.microsoft.com/users/jrwen/jrwen_files/publications/QC-WWW10.pdf>>, Proceedings of the 10th International Conference on World Wide Web, 2001, pp. 162-168.

Zhai. et al., "A Study of Smoothing Methods for Language Models Applied to Ad Hoc Information Retrieval," accessed at <<http://acm.org>>, Proceedings of the 24th Annual International ACM SIGIR Conference on Research and Development in Information Retrieval, 2001, 9 pages.

(56) References Cited

OTHER PUBLICATIONS

Enterprise software, retrieved at http://en.wikipedia.org/wiki/Enterprise_software, retrieved on Jun. 19, 2012, Wikipedia article, 3 pages.
Ganjam, et al., U.S. Appl. No. 13/413,179, "Entity Augmentation Service from Latent Relational Data," filed on Mar. 6, 2012, 54 pages.
Cheng, et al., "EntityRank: Searching Entities Directly and Holistically," retrieved at <<pubs/2007/entityrank-vldb07-cyc-jul07.pdf>>, Proceedings of the 33rd International Conference on Very Large Data Bases, Sep. 2007, 12 pages.
Cohen, et al., "Exploiting Dictionaries in Named Entity Extraction: Combining Semi-Markov Extraction Processes and Data Integration Methods," retrieved on at <<http://www.cs.cmu.edu/-wcohen/postscript/kdd-04-csmm.pdf>>, Proceedings of the Tenth ACM SIGKDD International Conference on Knowledge Discovery and Data mining, Aug. 2004, 10 pages.
Dong, et al., "Reference Reconciliation in Complex Information Spaces," retrieved at <<http://db.cs.washington.edu/.semex/reconciliation_sigmod.pdf>>, Proceedings of the 2005 ACM SIGMOD International Conference on Management of Data, 2005, 12 pages.
Ganti, et al., "Entity Catergorization Over Large Document Collections," retrieved at <<http://acm.org>>, Proceedings.Of the 14th ACM SIGKDD International Conference on Knowledge Discovery and Data Mining, Aug. 2008, pp. 274-282.
Gligorov, et al., "Using Google Distance to Weight Approximate Ontology Matches," retrieved at <<http://www.cs.vu.nl/~frankh/postscript/BNAIC07-WWW07.pdf>>, Proceedings of the 16th International Conference on World Wide Web, 2007, 2 pages.
Distributional hypothesis, retrieved at <<http://en.wikipedia.org/wiki/Distributional_hypothesis>>, retrieved on Mar. 1, 2012, Wikipedia online encyclopedia excerpt, 2 pages.
Cheng, et al., U.S. Appl. No. 13/527,601, "Data Services for Enterprises Leveraging Search System Data Assets," filed on Jun. 20, 2012, 58 pages.
Yakout, et al., "InfoGather: Entity Augmentation and Attribute Discovery by Holistic Matching with Web Tables," retrieved at <<http://acm.org>>, Proceedings of the 2012 International Conference on Management of Data, May 2012, pp. 97-108.
Pasca, Marius, "Weakly-Supervised Discovery of Named Entities Using Web Search Queries," retrieved at <<http://www.acm.org>>, Proceedings of the Sixteenth ACM Conference on Conference on Information and Knowledge Management, Nov. 2007, pp. 683-690.
Kim, et al., "A comparison of collocation-based similarity measures in query expansion," Information Processing and Management, No. 35, 1999, pp. 19-30.
Schenkel, et al., "Efficient Top-k Querying over Social-Tagging Networks," retrieved at <<http://acm.org>>, Proceedings of the 31st Annual International ACM SIGIR Conference on Research and Development in Information Retrieval, Jul. 2008, 8 pages.
Tsoukalas, et al., "PLEDS: A Personalized Entity Detection System Based on Web Log Mining Techniques," retrieved at <<http://www2.fas.sfu.ca/pub/cs/techreports/2008/CMPT2008-06.pdf>>, WAIM, Proceedings of the Ninth International Conference on Web-Age information Management, Jul. 2008, pp. 1-23.
Peters, et al., "Folksonomy and Information Retrieval," retrieved at <<http://wwwalt.phil-fak.uni-duesseldorf.de/infowiss/admin/public_dateien/files/1/1194344432asist_am07.pdf>>, Proceedings of the 7oth ASIS&T Annual Meeting, vol. 44, 2007, 33 pages.
Chirita, et al., "PTAG: Large Scale Automatic Generation of Personalized Annotation TAGs for the Web," retrieved at <<http://acm.org>>, Proceedings of the 16th International Conference on World Wide Web, May 2007, pp. 845-854.
Chaudhuri, et al., "Exploiting Web Search to Generate Synonyms for Entities," retrieved at <<http://www2009.org/proceedings/pdf/p151.pdf>>, Proceedings of the 18th International Conference on World Wide Web, April2009, pp. 151-160.
Chaudhuri, et al., "Mining Document Collections to Facilitate Accurate Approximate Entity Matching," retrieved at <<http://www.vldb.org/pvldb/2/vIdb09-315.pdf>>, Proceedings of the VLBD Endowment, vol. 2, No. 1, Aug. 2009, 12 pages.
Agrawal, et al., "Exploiting web search engines to search structured databases," retrieved at <<http://acm.org>>, Proceedings of the 18th International Conference on World Wide Web, Apr. 2009, pp. 501-510.
Baroni, et al., "Using cooccurrence statistics and the web to discover synonyms in a technical language," retrieved at <<http://clic.cimec.unitn.il/marco/publications/Irec2004/syn_lrec_2004.pdf>>, Proceedings of the LREC 2004, 2004, 4 pages.
"Microsoft Research Tech Fest 2012: Projects," retrieved at <<http://research.microsoft.com/en-us/events/techfest2012/projects.aspx>>, retrieved on Apr. 10, 2012, Microsoft Corporation, Redmond, WA, 7 pages.
Final Office Action of U.S. Appl. No. 12/465,832, mailed on Oct. 7, 2011, Surajit Chaudhuri, Identifying Synonyms of Entities Using Web Search, 13 pages.
Ananthanarayanan et al., "Rule Based Synonyms for Entity Extraction from Noisy Text", Proceedings of the Second Workshop on Analytics for Noisy Unstructured Text Data, pp. 31-38, 2008.
Appelt et al., "Introduction to Information Extraction Technology", Proceedings of the International Joint Conference on Artificial Intelligence Tutorial, 1999.
Arasu et al., "Transformation-Based Framework for Record Matching" Proceedings of the 24th IEEE International Conference on Data Engineering, pp. 40-49, 2008.
Arasu et al., "Learning String Transformations from Examples", Proceedings of the Publication of Very Large Database Endowment, pp. 2(1):514-525, 2009.
Chaiken et al., "Scope: Easy and Efficient Parallel Processing of Massive Data Sets", Proceedings of Very Large Database Endowment, pp. 1(2):1265-1276, 2008.
Dagan et al., "Contextual Word Similarity and Estimation from Sparse Data", Computer Speech and Language, 9:123-152, 1993.
Dean et al., "MapReduce: Simplified Data Processing on Large Clusters", Communications of the ACM—50th Anniversary Edition, vol. 51 Issue 1, pp. 107-113, Jan. 2008.
Han et al., "Mining Frequent Patterns without Candidate Generation" Proceedings of the 2000 ACM SIGMOD international Conference on Management of Data, pp. 1-12, 2000.
Manning et al., Foundations of Statistical Natural Language Processing, the MIT Press, 1999.
Michelson et al., "Mining Heterogeneous Transformations for Record Linkage", IIWeb, pp. 68-73, AAAI Press, 2007.
Office Action of U.S. Appl. No. 12/478,120, mailed on Feb. 27, 2012, Surajit Chaudhuri, "Identifying Synonyms of Entities Using a Document Collection", 18 pages.
Office Action of U.S. Appl. No. 12/478,120, mailed on Nov. 3, 2011, Surajit Chaudhuri, Identifying Synonyms of Entities Using a Document Collection, 8 pages.
Office Action of U.S. Appl. No. 12/465,832, mailed on Apr. 10, 2012, Surajit Chaudhuri, Identifying Synonyms of Entities Using Web Search, 16 pages.
Office Action of U.S. Appl. No. 12/465,832, mailed on Sep. 19, 2012, Surajit Chaudhuri, Identifying Synonyms of Entities Using Web Search, 18 pages.
"Non-Final Office Action", From U.S. Appl. No. 13/413,179, Mailed Apr. 3, 2013.
"Response to the Apr. 3, 2013 Non-Final Office Action," From U.S. Appl. No. 13/413,179, Filed Sep. 3, 2013.
"Final Office Action", From U.S. Appl. No. 13/413,179, Mailed Dec. 5, 2013.
"Response to the Dec. 5, 2013 Non-Final Office Action," From U.S. Appl. No. 13/413,179, Filed Jun. 5, 2014.
"Non-Final Office Action", From U.S. Appl. No. 13/413,179, Mailed Jan. 15, 2015.
"Non-Final Office Action", From U.S. Appl. No. 12/779,964 , Mailed Feb. 14, 2012.
"Response to the Feb. 14, 2012 Non-Final Office Action," From U.S. Appl. No. 12/779,964, Filed Jun. 11, 2012.
"Final Office Action", From U.S. Appl. No. 12/779,964 , Mailed Aug. 27, 2012.

(56) References Cited

OTHER PUBLICATIONS

"Response to the Aug. 27, 2012 Final Office Action," From U.S. Appl. No. 12/779,964, Filed Nov. 1, 2012.
"Non-Final Office Action", From U.S. Appl. No. 12/779,964 , Mailed Nov. 18, 2013.
"Response to the Nov. 18, 2013 Non-Final Office Action," From U.S. Appl. No. 12/779,964, Filed: Feb. 18, 2014.
"Final Office Action", From U.S. Appl. No. 12/779,964 , Mailed Jun. 3, 2014.
"Response to the Jun. 3, 2014 Final Office Action," From U.S. Appl. No. 12/779,964, Filed Oct. 2, 2014.
"Response to the Nov. 3, 2011 Non-Final Office Action," From U.S. Appl. No. 12/478,120, Filed Feb. 2, 2012.
"Response to the Feb. 27, 2012 Final Office Action," From U.S. Appl. No. 12/478,120, Filed Jun. 27, 2012.
"Preliminary Report on Patentability", From PCT Application No. PCT/US2013/027203, Mailed Sep. 9, 2014.
"Non-Final Office Action," From U.S. Appl. No. 131487,260, Mailed Mar. 7, 2013.
"Response to the Mar. 7, 2013 Non-Final Office Action," From U.S. Appl. No. 13/487,260, Filed Aug. 6, 2013.
"Response to the May 23, 2011 Non-Final Office Action," From U.S. Appl. No. 12/465,832, Filed Aug. 16, 2011.
"Response to the Oct. 7, 2011 Final Office Action," From U.S. Appl. No. 121465,832, Filed Dec. 22, 2011.
"Response to the Apr. 10, 2012 Non-Final Office Action," From U.S. Appl. No. 12/465,832, Filed Jul. 10, 2012.
"Response to the Sep. 19, 2012 Final Office Action," From U.S. Appl. No. 12/465,832, Filed Dec. 18, 2012.
"Response to the Jun. 13, 2013 Non-Final Office Action," From U.S. Appl. No. 121465,832, Filed Jul. 30, 2012.
"Non-Final Office Action", From U.S. Appl. No. 12/465,832, Mailed Jun. 13, 2013.
"Final Office Action and Examiner Initiated Interview Summary", From U.S. Appl. No. 12/465,832, Mailed Oct. 21, 2013.
"Notice of Allowance" from U.S. Appl. No. 12/235,635, Mailed Dec. 11, 2014.
"Non-Final Office Action", From U.S. Appl. No. 12/235,635, Mailed Feb. 16, 2011.
"Response to the Feb. 16, 2011 Non-Final Office Action," From U.S. Appl. No. 12/235,635, Filed Jul. 18, 2011.
"Final Office Action", From U.S. Appl. No. 12/235,635, Mailed Oct. 25, 2011.
"Response to the Oct. 25, 2011 Final Office Action," From U.S. Appl. No. 12/235,635, Filed Mar. 25, 2012.
"Advisory Action", From U.S. Appl. No. 12/235,635, Mailed Feb. 6, 2012.
"Notice of Allowance" from U.S. Appl. No. 12/235,635, Mailed May 23, 2014.
"Non-Final Office Action", From U.S. Appl. No. 12/235,635, Mailed Nov. 18, 2013.
"Response to the Nov. 18, 2013 Non-Final Office Action," From U.S. Appl. No. 12/235,635, Filed Feb. 17, 2014.
"Supplemental Response", From U.S. Appl. No. 12/235,635, Filed Mar. 11, 2014.
"Non-Final Office Action", From U.S. Appl. No. 13/527,601, Mailed Jan. 15, 2015.
"Notice of Allowance" from U.S. Appl. No. 12/235,635, Mailed Aug. 29, 2014.
Rodriguez et al. "Determining Semantic Similarity Among Entity Classes from Different Ontologies", IEEE Transactions on Knowledge and Data Engineering, Mar./Apr. 2003, vol. 15, No. 2, pp. 442-456.
European Search Report mailed Mar. 4, 2015 from European Patent Application No. 13757813.4, 3 pages.
Examination Report mailed Mar. 11, 2015 from European Patent Application No. 13757813.4, 4 pages.
Response filed Apr. 8, 2015 to Examination Report mailed Mar. 11, 2015 from European Patent Application No. 13757813.4, 17 pages.
Voluntary Amendment filed Feb. 28, 2015 from European Patent Application No. 201380013249.X, 8 pages.
Response filed Apr. 14, 2015 to the Non-Final Office Action mailed Jan. 15, 2015 from U.S. Appl. No. 13/527,601, 12 pages.
Amendment/Response filed Apr. 15, 2015 to the Non-Final Office Action mailed Jan. 15, 2015 to from U.S. Appl. No. 13/413,179, 23 pages.
Ghani et al., "Text Mining for Product Attribute Extraction", ACM SIGKDD Explorations Newsletter, vol. 8, Issue 1, Jun. 1, 2006, pp. 41-48.
Agrawal et al., "Mining Association Rules between Sets of Items in Large Databases," Proceedings of the 1993 ACM SIGMOD International Conference on Management of Data, May 1993, 10 pages.
Agrawal et al., "Scalable Ad-hoc Entity Extraction from Text Collections," Proceedings of the VLDB Endowment VLDB Endowment, vol. 1, Issue 1, Aug. 2008, pp. 945-957, 13 pages.
Aymerich et al., "Automatic Extraction of Entries for a Machine Translation Dictionary Using Bitexts," Machine Translation Summit XI, Sep. 10, 2007, 7 pages.
Booth et al., "Query Sentences as Semantic (Sub) Networks," 2009 IEEE International Conference on Semantic Computing, 2009, 6 pages.
Chaudhuri et al., "Mining the Web to Facilitate Fast and Accurate Approximate Match," Proceedings of WWW2009, Apr. 20-24, 2009, Madrid, Spain, 10 pages.
Cheng et al., "Robust Discovery of Entity Synonyms Using Query Logs," U.S. Appl. No. 61/606,481, filed Mar. 5, 2012, 61 pages.
Egenhofer et al., "Determining Semantic Similarity among Entity Classes from Difference Ontologies," IEEE Transactions on Knowledge and Data Engineering, vol. 15, No. 2, Mar. 1, 2003, pp. 442-456, 16 pages.
Manning et al., Foundations of Statistical Natural Language Processing, the MIT Press, 1999, 717 pages.
Nie et al., "Unknown Word Detection and Segmentation of Chinese using Statistical and heuristic Knowledge," Communications of Colips, 1995, vol. 5, No. 1-2, pp. 47-57, 11 pages.
Response filed Mar. 25, 2012 to Final Office Action mailed Oct. 25, 2011 from U.S. Appl. No. 12/235,635, 29 pages.
Supplemental Amendment filed Mar. 11, 2014 from U.S. Appl. No. 12/235,635, 10 pages.
Requirement for Restriction/Election mailed Sep. 12, 2011 from U.S. Appl. No. 12/478,120, 6 pages.
Response filed Oct. 12, 2011 to Requirement for Restriction/Election mailed Sep. 12, 2011 from U.S. Appl. No. 12/478,120, 4 pages.
Non-Final Office Action mailed Apr. 2, 2013 from U.S. Appl. No. 13/413,179, 30 pages.
Response filed Sep. 3, 2013 to Non-Final Office Action mailed Apr. 2, 2013 from U.S. Appl. No. 13/413,179, 15 pages.
Final Office Action mailed Dec. 5, 2013 from U.S. Appl. No. 13/413,179, 31 pages.
Response filed Jun. 5, 2014 to Final Office Action mailed Dec. 5, 2013 from U.S. Appl. No. 13/413,179, 19 pages.
Notice of Allowance and Examiner Initiated Interview Summary mailed Jun. 17, 2015 from U.S. Appl. No. 13/413,179, 16 pages.
Notice of Allowance mailed Oct. 17, 2013 from U.S. Appl. No. 13/487,260, 11 pages.
Non-Final Office Action mailed Jul. 30, 2015 from U.S. Appl. No. 13/527,601, 12 pages.
Requirement for Restriction/Election mailed Apr. 25, 2014 from U.S. Appl. No. 13/594,473, 6 pages.
Response filed Aug. 25, 2014 to Requirement for Restriction/Election mailed Apr. 25, 2014 from U.S. Appl. No. 13/594,473, 10 pages.
Non-Final Office Action mailed Sep. 11, 2014 from U.S. Appl. No. 13/594,473, 13 pages.
Amendment and Response filed Dec. 11, 2014 to Non-Final Office Action mailed Sep. 11, 2014 from U.S. Appl. No. 13/594,473, 13 pages.
Notice of Allowance and Examiner Initiated Interview mailed Jan. 14, 2015 from U.S. Appl. No. 13/594,473, 11 pages.

(56) References Cited

OTHER PUBLICATIONS

Amendment and Response filed Apr. 14, 2015 to Notice of Allowance mailed Jan. 14, 2015 from U.S. Appl. No. 13/594,473, 10 pages.
Non-Final Office Action mailed May 12, 2015 from U.S. Appl. No. 13/594,473, 6 pages.
Amendment and Response filed Aug. 12, 2015 to Non-Final Office Action mailed May 12, 2015 from U.S. Appl. No. 13/594,473, 10 pages.
Notice of Allowance mailed Aug. 26, 2015 from U.S. Appl. No. 13/594,473, 8 pages.
International Search Report and Written Opinion mailed Feb. 13, 2014 from PCT Patent Application No. PCT/US2013/055500, 12 pages.
International Preliminary Report on Patentability and Written Opinion mailed Feb. 24, 2015 from PCT Patent Application No. PCT/US2013/055500, 9 pages.
Notice of Allowance mailed Apr. 7, 2015 from U.S. Appl. No. 12/235,635, 16 pages.
Notice of Allowance mailed May 22, 2015 from U.S. Appl. No. 12/235,635, 16 pages.
Notice of Allowance Mailed Jun. 6, 2013 from U.S. Appl. No. 121478,120, 12 pages.
Applicant Initiated Interview mailed Oct. 30, 2012 from U.S. Appl. No. 12/779,964, 3 pages.
Applicant Initiated Interview mailed Mar. 21, 2014 from U.S. Appl. No. 12/779,964, 3 pages.
Examiner Initiated Interview mailed Mar. 24, 2015 from U.S. Appl. No. 12/779,964, 2 pages.
Non-Final Office Action mailed Apr. 29, 2015 from U.S. Appl. No. 12/779,964, 26 pages.
Response filed Jul. 21, 2015 to Non-Final Office Action mailed Apr. 29, 2015 from U.S. Appl. No. 12/779,964, 11 pages.
Bellahsene et al., "Schema Matching and Mapping," Springer, 2011.
Response filed Nov. 30, 2015 to the Non-Final Office Action mailed Jul. 30, 2015 from U.S Appl. No. 13/527,601, 16 pages.
Response to Restriction Requirement filed Aug. 27, 2015 from U.S Appl. No. 13/635,274, 9 pages.
Non-Final Office Action mailed Sep. 28, 2015 from U.S Appl. No. 13/635,274, 21 pages.
International Search Report and Written Opinion mailed Apr. 4, 2013 from PCT Patent Application No. PCT/CN2012/077888, 7 pages.
International Preliminary Report on Patentability mailed Jan. 8, 2015 from PCT Patent Application No. PCT/CN2012/077888, 6 pages.
Response filed Jan. 28, 2016 to Non-Final Office Action mailed Sep. 28, 2016 from U.S. Appl. No. 13/635,274, 24 pages.
Final Office Action mailed Mar. 11, 2016 from U.S. Patent Application No. 13/527,602, 5 pp.. (MS336388.01).
Non-Final Office Action dated Apr. 5, 2016 from U.S Appl. No. 14/864,430, 15 pages.
Applicant-Initiated Interview Summary mailed Nov. 4, 2015 from U.S. Appl. No. 13/527,601, 4 pages.
Notice of Allowance and Examiner Initiated Interview Summary mailed Nov. 6, 2015 from U.S. Appl. No. 12/779,964, 17 pages.
Voluntary Amendment filed Jul. 1, 2015 from China Patent Application No. 201380044316.4, 10 pages.
Notice on the First Office Action mailed Apr. 13, 2016 from China Patent Application No. 201380013249.X, 15 pages.
Response and After Final Consideration Program Request filed Apr. 27, 2016 to the Final Office Action mailed Mar. 11, 2016 from U.S. Appl. No. 13/527,602, 14 pages.
Jiang et al., "On the Development of Text Input Method—Lessons Learned," retrieved at <<http://arxiv.org.ftp.arxiv/papers/0704/0704.3665.pdf>>, on Apr. 2007, 10 pages.
Restriction Requirement mailed Jul. 2, 2015 from U.S Appl. No. 13/635,274, 6 pages.
Response to Restriction Requirement filed Aug. 27, 2015 from U.S. Appl. No. 13/635,274, 9 pages.

Non-Final Office Action mailed Sep. 28, 2015 from U.S. Appl. No. 13/635,274, 21 pages.
International Search Report and Written Opinion mailed Apr. 4, 2013 from PCT Patent Application No. PCT/CN2012/077888, 7 pages.
International Preliminary Report on Patentability mailed Jan. 8, 2015 from PCT Patent Application No. PCT/CN2012/077888, 6 pages.
Advisory Action, Examiner-Initiated Interview Summary and After Final Consideration Program Decision mailed May 31, 2016 from U.S. Appl. No. 13/527,601, 5 pages.
Final Office Action mailed Jun. 13, 2016 from U.S. Appl. No. 13/635,274, 28 pages.
Response filed Jun. 24, 2016 to Final Office Action mailed Mar. 11, 2016 from U.S. Appl. No. 13/527,601, 14 pages.
First Office Action mailed Jun. 22, 2016 from China Patent Application No. 201380044316.4, 9 pages.
Naptali et al., "Integration of Topic Dependent Class Language Model and Cache-based Unigram Scaling", Interspeech, Feb. 26-27, 2010, 7 pages.
Response filed Aug. 10, 2016 to the Final Office Action mailed Jun. 13, 2016 from U.S. Appl. No 13/635,274, 25 pages.
Amadeo, Ron, "2016 Google Tracker: Everything Google is working for the next year", retrieved at <<http://arstechnica.com/gadgets/2016/01/2016-google-tracker-everything-google-is-working-on-for-the-new-year/>>, on Aug. 26, 2016, published Jan. 8, 2016, 5 pages.
Apple, "Chinese Input Method: Use the Pinyin—Simplified Input Source", retrieved at https://support.apple.com/kb/PH22620?locale=en_US>>, on Aug. 26, 2016, published Sep. 30, 2015, 4 pages.
Apple, IOS Developer Library, "Managing the Keyboard", retrieved at https://developer.apple.com/library/prerelease/content/documentation/StringsTextFonts/Conceptual/TextAndWebiPhone0S/KeyboardManagement/KeyboardManagement.html>>, on Aug. 26, 2016, published Mar. 10, 2014, 9 pages.
Eadiccio, Lisa, "10 Ways Texting on Your iPhone is About to Change Forever", Time, retrieved at http://time.com/4367056/apple-imessage-wwdc-ios-10-iphone/>>, on Aug. 26 ,2016, published Jun. 14, 2016, 5 pages.
facebook/draft-js, retrieved at <<https://github.com/facebook/draft-js.git>>, on Aug. 26, 2016, 3 pages.
Google Input Tools—Home, retrieved at <<http://web.archive.org/web/20120704053911/http://google.com/inputtools/>>, on Jul. 4, 2012, 2 pages.
Google Input Tools, "Supported Languages", retrieved at <<https://www.google.com/inputtools/help/languages.html>>, on Aug. 26, 2016, 5 pages.
Goggle Play, "WeChat—Android Apps on Google Plan", retrieved at <<https://play.google.com/store/apps/details? id=com.tencent.mm&referrer=utm_source%3Dwechat.com%26utm_medium%3Ddesktop>>, on Nov. 7, 2016, 3 pages.
MDGB, "Enabling Pinyin input on your computer", retrieved at <<https://www.facebook.com/notes/mdbg/enabling-pinyin-input-on-your-computer/419757796861/>>, on Aug. 26, 2016, published Sep. 4, 2010, 2 pages.
Mozur, Paul, "Seeking Access to Facebook in China, Zuckerberg Courts Risks", The New York Times, retrieved at <<http://www.nytimes.com/2016/03/21/business/seeking-access-to-facebook-in-china-zuckerberg-courts-risks.html>>, on Aug. 26, 2016, published Mar. 20, 2016, 3 pages.
Salier-Hellendag, Isaac, "Facebook open sources rich text editor framework for Draft.js", retrieved at <<https://code.facebook.com/posts/1684092755205505/facebook-open-sources-rich-text-editor-framework-draft-js/>>, on Aug. 26, 2016, published Feb. 26, 2016, 10 pages.
Sander, Ed, "Demo of Weixin/WeChat", retrieved at <<https://www.youtube.com/watch?v=Avp10IZjDN8>>, on Aug. 26, 2016, published Apr. 18, 2013, 2 pages.
WeChat, captured by the Internet archive on Jan. 14, 2013, at <<https://web.archive.org/web/20130114231337/http://www.wechat.com/en/>>, 2 pages.

(56) References Cited

OTHER PUBLICATIONS

Weixin, "WeChat—Free messaging and calling app", retrieved at <<https://translate.google.com/translate?sl=auto&tl=en&js=y &prev=_t&hl=en&ie=UTF-8&u=http%3A%2F%2Fweixin.qq. com%2F&edit-text=&act=url>> (as translated by Google Translate), on Sep. 20, 2016, 1 page.

Non-Final Office Action mailed Oct. 13, 2016 from U.S. Appl. No. 13/635,274, 25 pages.

Notice of Allowance mailed Nov. 18, 2016 from U.S. Appl. No. 12/779,964, 20 pages.

Corrected Notice of Allowability mailed Dec. 22, 2016 from U.S. Appl. No. 12/779,964, 6 pages.

Second Office Action mailed Dec. 1, 2016 from China Patent Application No. 201380013249.X, 7 pages.

Final Office Action mailed Oct. 26, 2016 from U.S. Appl. No. 14/864,430, 33 pages.

Response filed Dec. 30, 2016 to the Non-Final Office Action mailed Oct. 13, 2016 from U.S Appl. No. 13/635,274, 18 pages.

\* cited by examiner

TARGETED DISAMBIGUATION OF NAMED ENTITIES

BACKGROUND

In some applications, it is desirable to identify occurrences of a named entity in a set of documents. A named entity often corresponds to a proper noun, e.g., referring to a name of a person, organization, location, product, event, etc. This task may be challenging, however, because a named entity may correspond to a string having two or more meanings (i.e., a homograph). For example, assume the goal is to identify documents which contain reference to Apple® computers. Some of the documents may use the word "apple" in the context of fruit, rather than computers.

One known way to address this problem is via a content-matching technique. This technique entails identifying the context in which a document mentions a string corresponding to the named entity in question, e.g., the word "apple." The technique then compares this context information with a-priori reference information associated with the named entity, such as an online encyclopedia entry corresponding to Apple® computers. If there is a match between the context information and the reference information, the technique can conclude that the mention of "apple" in the document likely corresponds to Apple® computers.

This approach, however, is not fully satisfactory. One drawback is that many named entities have no counterpart reference documents that provide authoritative information regarding the named entities.

SUMMARY

Described herein is a targeted disambiguation system for determining true mentions of a list of named entities in a collection of documents. In one implementation, the system operates by receiving a list of named entities. The named entities homogenously pertain to a same subject matter domain. The system then determines a set of candidate mentions. Each candidate mention corresponds to an occurrence of a string in a collection of documents that corresponds to a named entity in the list. The system then identifies true mentions within the set of candidate mentions. Each true mention corresponds to a valid occurrence of a named entity in the collection of documents. Generally stated, the system identifies the true mentions by leveraging the homogeneity in the list of named entities—namely, the fact that the entities pertain to the same subject matter domain.

According one illustrative feature, the system can identify the true mentions without the aid of reference documents. In this sense, the named entities, which are the targets of the analysis performed by the system, may be considered ad-hoc in nature.

According to another illustrative feature, the system can identify the true mentions by applying three hypotheses described in detail herein: (a) a context similarity hypothesis; (b) a co-occurrence hypothesis; and (c) an interdependency hypotheses.

According to another illustrative feature, the system can identify the true mentions by constructing a graph, and then generating ranking scores using the graph. The graph expresses information which represents the three hypotheses mentioned above.

According to another illustrative feature, the system can integrate the use of additional knowledge about the named entities, if available (although this is not required). The system can perform this task by adding virtual nodes to the graph; the virtual nodes correspond to reference documents associated with the named entities.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
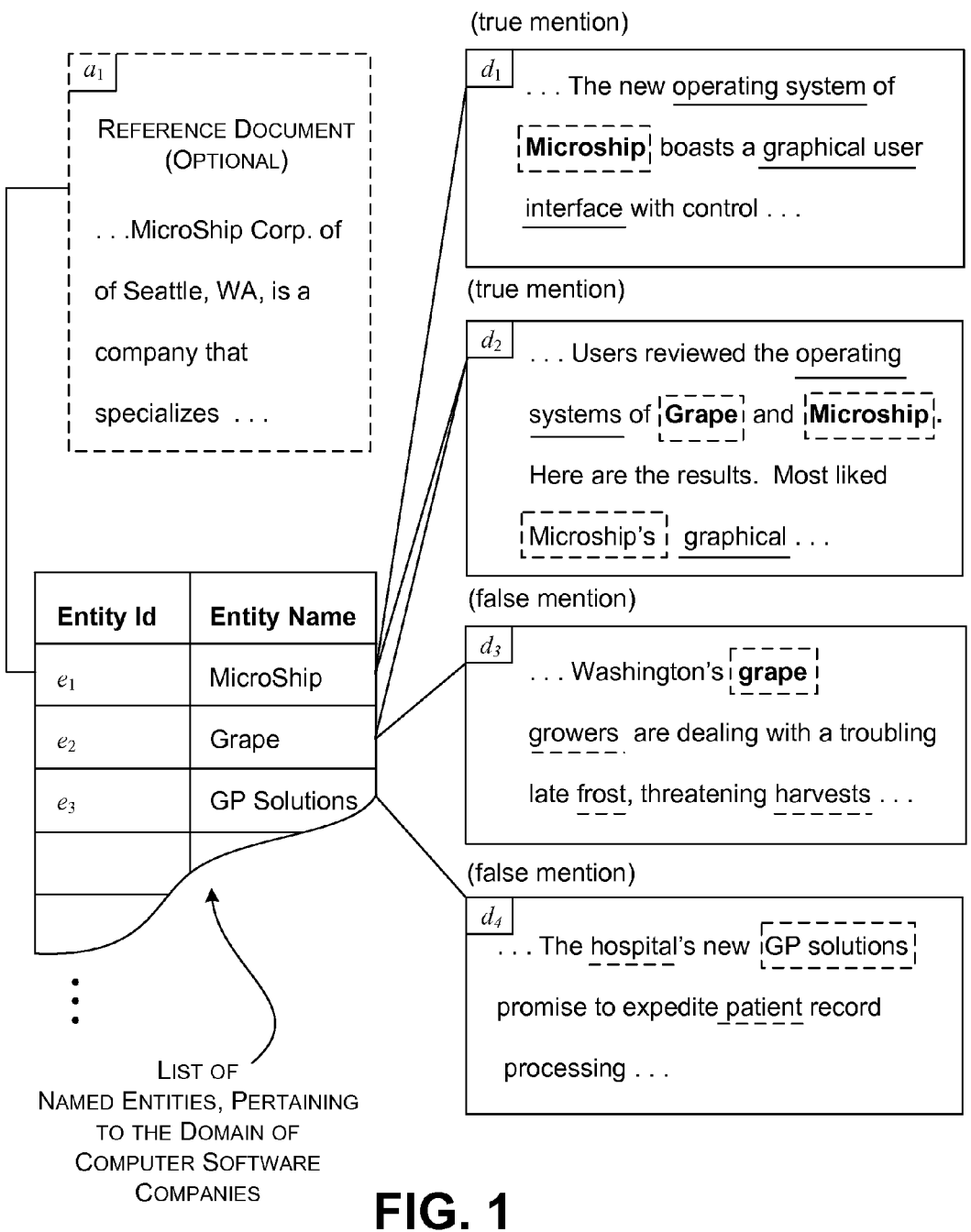
FIG. 1 shows a correlation between three named entities in a list and four documents.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a targeted disambiguation system (TDS) that identifies true mentions of named entities in a collection of documents. Section B describes functionality for creating a graph used by the TDS. Section C describes functionality for computing raw context similarity scores that are used to construct the graph. Section D describes functionality for computing co-occurrence scores which are also used to construct the graph. Section E describes functionality for computing weights that are assigned to edges in the graph. Section F describes functionality for computing ranking scores based on the graph. Section G describes functionality for leveraging additional information in the task of identifying true mentions, if available. And Section H describes illustrative computing functionality for implementing any of the operations set forth in the preceding sections.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section H, to be discussed in turn, provides additional details regarding illustrative physical implementations of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Overview

A targeted disambiguation system (TDS) is described herein which determines true mentions of a list of named entities within a collection of documents D. To begin with, this section sets forth the meaning of terms used in this description.

A named entity. A named entity refers to any subject matter that is a target of interest, including a person, a location, an organization, a product, an event, and so on. In many cases, a named entity refers to a proper noun, but named entities are not limited to proper nouns.

A subject matter domain. A subject matter domain pertains to a field associated with a named entity. For example, without limitation, one list of named entities may pertain to the field of computer software companies. Another list of named entities may pertain to shoes produced by a particular manufacturer. Another list of named entities may pertain to locations within a particular region of the world, and so on. The subject matter domain need not conform to an accepted classification in any classification scheme (although, in some cases, it may). In this sense, the subject matter domain may be considered ad-hoc in nature.

A document. A document refers to any textual information that conveys any meaning in any environment. In some environments, a document may refer to a text document containing one or more pages (although the document may also contain other types of media content, such as images, etc.). Alternatively, or in addition, a document may refer to a web page or a web site. Alternatively, or in addition, a document may pertain to a message of any type, such as an IM message, a Facebook message, a Twitter message, an SMS message, etc. Alternatively, or in addition, a document may refer to a record in a database, and so on.

A candidate mention. A candidate mention refers to the occurrence of a string associated with a named entity within a document. For example, a candidate mention of the computer software company "Apple" may correspond to the string "apple" within a document. A candidate mention is formally identified by a paring of a named entity $e_i$, and a document $d_j$ that contains the string associated with the named entity. In other words, the pair is denoted as $(e_i, d_j)$. A candidate mention is qualified as being a "candidate" because it may or may not be a true mention of the named entity. To facilitate description, a candidate mention may also be referred to as simply the occurrence of a named entity $e_i$ in the document $d_j$ (that is, without making explicit reference to a string associated with $e_i$).

A string. A string $s_i$ refers to a series of one or more characters associated with a named entity. The string may also refer to one or more other concepts besides the named entity. A string may include one or more words.

A true mention. A true mention corresponds to a candidate mention that is a valid occurrence of a named entity in a document. For example, a document that uses the word "apple" when discussing the company Apple Inc., corresponds to a true mention of the named entity "Apple."

A false mention. A false mention corresponds to a candidate mention that is not a valid occurrence of a named entity in a document. For example, a document that uses the word "apple" when discussing the fruit "apple" is a false mention of the named entity "Apple" (presuming that the named entity "Apple" refers to the computer software company Apple Inc.).

An occurrence. An occurrence refers to a single candidate mention of a named entity in a document. A document may contain zero, one, two, or more occurrences of any named entity. A candidate mention $(e_i, d_j)$ means that the document $d_j$ contains at least one occurrence of $e_i$, although it may actually include any number of occurrences of $e_i$.

Context. The context refers to the circumstances in which a candidate mention appears in a document. In one implementation, a context may correspond to other words in the document, such as, without limitation, the z words preceding the candidate mention and the z words following the candidate mention.

FIG. 1 provides a simplified example of the operation of the TDS. From a high-level perspective, the TDS accepts a list of named entities pertaining to any subject matter domain. In the merely illustrative case of FIG. 1, the TDS accepts a list that includes at least three entities pertaining to computer software companies. The first named entity ($e_1$) has the fictional company name of "Microship." The second named entity ($e_2$) has the fictional company name of "Grape." The third entity has the fictional company name "GP solutions." The purpose of the TDS is to identify true mentions of these three named entities within a corpus of documents. FIG. 1 shows merely four representative documents in the corpus of documents ($d_1$, $d_2$, $d_3$, and $d_4$).

More specifically, consider document $d_1$. This document appears to be discussing a product produced by the company "Microship," and therefore likely corresponds to a true mention of "Microship." The document $d_2$ mentions both "Microship" and "Grape" in the context of computer software, and therefore likely includes true mentions of both "Microship" and "Grape." The document $d_3$, by contrast, uses the word "grape" in the context fruit, and is therefore likely a false mention of the company "Grape." Similarly, the document $d_4$ uses the string "GP solutions" in the context of a medical environment, where "GP" likely refers to "general practitioner," rather than the computer software company named "GP Solutions."

The TDS can automatically generate the above conclusion by leveraging the homogeneity of the list of named entities—namely, the fact that all of the named entities belong to the same subject matter domain. More specifically, the TDS identifies true mentions by applying three hypotheses. Each of the three hypotheses pertains to a different observation which depends on the homogeneity of the list of named entities.

Context similarity. A first hypothesis posits that a context between two true mentions is more similar than between two false mentions, across two distinct named entities in the list. The four documents shown in FIG. 1 illustrate this premise. For example, the contexts of $d_1$ and $d_2$ share the contextual words "operating system" and "graphical user interface." This stems from the fact that "Microship" and "Grape" both identify computer software companies, and therefore documents that are truly directed to these companies can be expected to discuss similar types of products. By contrast, $d_3$ pertains to fruit, while $d_4$ pertains to a medical environment. Since these concepts are dissimilar, the contextual words in $d_3$ ("growers," "frost," "harvest," etc.) can be expected to be a poor match for the contextual words in $d_4$ ("hospital," "patient," etc.).

Further, the context between two true mentions can generally be expected to be more similar than between a true mention and a false mention. The example of FIG. 1 also supports this observation. For example, the contextual words in $d_1$ and $d_2$ are not found in either $d_3$ and $d_4$, and vice versa.

Note, however, that there can be similar context between false mentions associated with a single named entity. For example, there may be several false mentions for the named entity "Grape" that pertain to fruit. These false mentions may very well have similar context, e.g., by mentioning words like "vine," "harvest," etc. The TDS takes this issue into account in a manner set forth in greater detail below.

Co-mention. A second hypothesis posits that, if plural named entities have candidate mentions in a same document, there is an elevated likelihood that these candidate mentions correspond to true mentions. For example, document $d_2$ mentions both "Microship" and "Grape," strings corresponding to two named entities from the list. Based on the second hypothesis, it is therefore likely that $d_2$ contains two true mentions.

Interdependency. A third hypothesis posits that, if a particular candidate mention has similar context with one or more true mentions, there is an elevated likelihood that the particular candidate mention is also a true mention. For example, assume that it is established that document $d_2$ is a true mention of the named entity "Microship," e.g., based on the co-mention hypothesis and/or based on other evidence. Further assume that it is established that document $d_2$ has a similar context to document $d_1$. This means that the candidate mention in document $d_1$ is also likely to be a true mention. In other words, this hypothesis posits that true mentions will propagate their positive relevance to related candidate mentions.

In one implementation, the TDS can pick out the true mentions from the set of candidate mentions without a-priori knowledge of the subject matter domain to which the entities pertain.

Further, the TDS can establish the true mentions without relying on any additional knowledge regarding the named entities. This feature is helpful because many named entities may have no counterpart reference information. For example, consider a list that identifies fifty sneaker brands produced by a particular manufacturer. It is quite likely that reference information will not be available for at least some of the sneaker brands in the list, e.g., due to lack of widespread interest in these brands among the general public and/or any other reason. Entities that lack reference information may be regarded as ad-hoc entities. Indeed, these ad-hoc entities need not even appear in any dictionaries, directories, ontologies, knowledge bases, etc.

Nevertheless, suppose that additional knowledge exists pertaining to at least some of the named entities in the list. For example, suppose that a reference document exists which provides authoritative information regarding the first entity, Microship. The TDS can integrate this knowledge into its determination of true mentions. Section G provides additional information regarding this aspect of the TDS.

Figure 2:
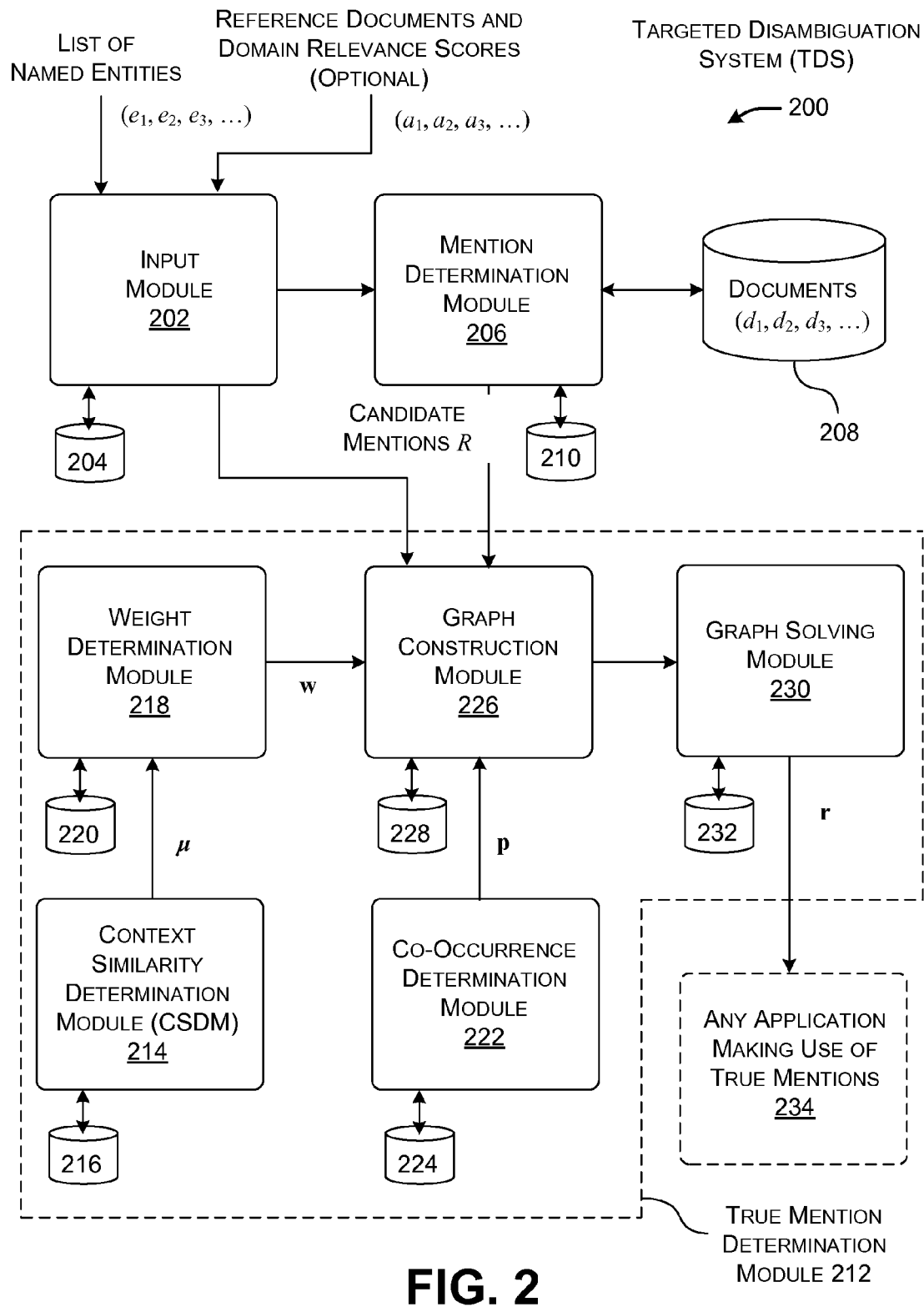
FIG. 2 shows a targeted disambiguation system (TDS) which determines true mentions of named entities in a collection of documents.

Advancing to FIG. 2, this figure shows one implementation of a targeted disambiguation system (TDS) 200. The TDS 200 is said to be "targeted" in the sense that the system attempts to find true mentions regarding an established set of named entities. This is in contrast to some systems which identify any named entities within a group of documents (e.g., by clustering), without targeting a-priori entities of interest.

The TDS 200 can include (or can be conceptualized as including) a number of modules that perform different functions. Each of these modules will be described below in turn. Later sections will provide additional information regard individual modules shown in FIG. 2.

To begin with, an input module 202 receives a list of named entities from any source, pertaining to any subject matter domain. For example, the input module 202 can receive a list of named entities that are manually input by a user. Alternatively, or in addition, the input module 202 can extract the list of named entities from a pre-existing table, database, and/or some other source (or sources). The input module 202 can then store the list of named entities in a data store 204.

A mention determination module 206 determines occurrences of strings associated with the named entities within a collection of documents. The occurrences correspond to candidate mentions because it is not yet resolved whether they are true or false mentions. The mention determination module 206 can perform its function using any search functionality, such as by relying on an inverted index provided by a search engine or a database retrieval engine to find strings within documents.

The mention determination module 206 can also optionally expand each named entity in the list to a group of equivalent terms associated with the named entity (such as synonyms). For example, the mention determination module 206 may expand the named entity "GP Solutions" to its full name "Great Plains Solutions." The mention determination module 206 can perform this operation using any expansion resources, such as a thesaurus dictionary, an acronym dictionary, a stemming analysis module, etc. As a whole, this expansion operation yields an expanded list of named entities. The mention determination module 206 can then determine candidate mentions for each named entity in the expanded list of entities. However, to facilitate explanation, it will henceforth be assumed that the mention determination module 206 only finds candidate mentions for the strings in the list of named entities, in their given form.

The documents can be provided in a data store 208. The data store 208 can pertain to information provided at a single site or information distributed over plural sites. For example, in the latter case, the documents may pertain to documents provided in various repositories that are accessible via a wide area network, such as the Internet.

The mention determination module 206 can store the candidate mentions in a data store 210. As stated above, each candidate mention will be referred to herein as a pairing of a particular entity (e.g., entity $e_i$) and a particular document (e.g., document $d_j$)—that is, $(e_i, d_j)$, meaning that $d_j$ contains at least one occurrence of a string associated with $e_i$. The complete set of candidate mentions is referred to as R.

A true mention determination module 212 operates on the candidate mentions in the data store 210 to pick out the true mentions from the false mentions. Within that functionality, a context similarity determination module (CSDM) 214 determines a context similarity score for each pair of candidate mentions (providing that the pair satisfies the criterion set forth below). The context similarity score describes a degree to which a first context associated with a first candidate mention matches a second context associated with a second candidate mention. The CSDM 214 can store the context similarity scores in a data store 216. Section C provides additional information regarding the computations performed by the CSDM 214.

A weight determination module 218 computes weights based, in part, on the context similarity scores. The weight determination module 218 can store the weights that it computes in a data store 220. Section E provides additional information regarding the computations performed by the weight determination module 218.

A co-occurrence determination module 222 determines a co-occurrence score for each candidate mention in the set of candidate mentions. The co-occurrence score quantifies an extent to which the document associated with the candidate mention includes two or more strings associated with different named entities from the list of named entities. The co-occurrence score can also be regarded as a "prior" score because it provides a-priori information regarding the likelihood that a candidate mention is a true mention. The co-occurrence determination module 222 can store the co-occurrence scores in a data store 224. Section D provides additional information regarding the computations performed by the co-occurrence determination module 222.

A graph construction module 226 constructs a graph data structure ("graph") that includes nodes associated with the set of candidate mentions. Further, the graph construction module 226 assigns a co-occurrence score (calculated by the co-occurrence determination module 222) to each node. Further, the graph construction module 226 generates an edge between each pair of nodes, and assigns a weight to that edge (as calculated by the weight determination module 218). Finally, the graph construction module 226 assigns a to-be-determined ranking score to each node. The graph construction module 226 can store the graph that it generates in a data store 228. Section B provides further information regarding the construction of the graph.

A graph solving module 230 applies a solving technique on the graph to determine the unknown ranking scores associated with the nodes in the graph. These ranking scores quantify the extent to which the candidate mentions associated with the nodes can be considered true mentions. The graph solving module 230 can store its results in a data store 232. Section F provides further information regarding one manner which can be used to determine the ranking scores.

An application 234 can make use of the ranking scores provided by the graph solving module 230. To cite one example, an enterprise may wish to perform a search over a corpus of documents to extract additional information regarding a list of named entities that appear in the table. The enterprise can then add some of the discovered information to the table. In another example, an enterprise may wish to identify and extract comments made by users regarding products made and sold by the enterprise. For example, the comments may appear in a blogs, Twitter messages, IM messages, etc.

FIG. 2 also indicates that the input module 202 can optionally receive one or more reference documents which provide additional information regarding the named entities in the list. The graph construction module 226 then represents these reference documents in its graph as virtual nodes. Section G provides additional information regarding the manner in which the TDS 200 can take into account additional information, when it is available (although the TDS 200 can perform its analysis without the additional information).

Figure 3:
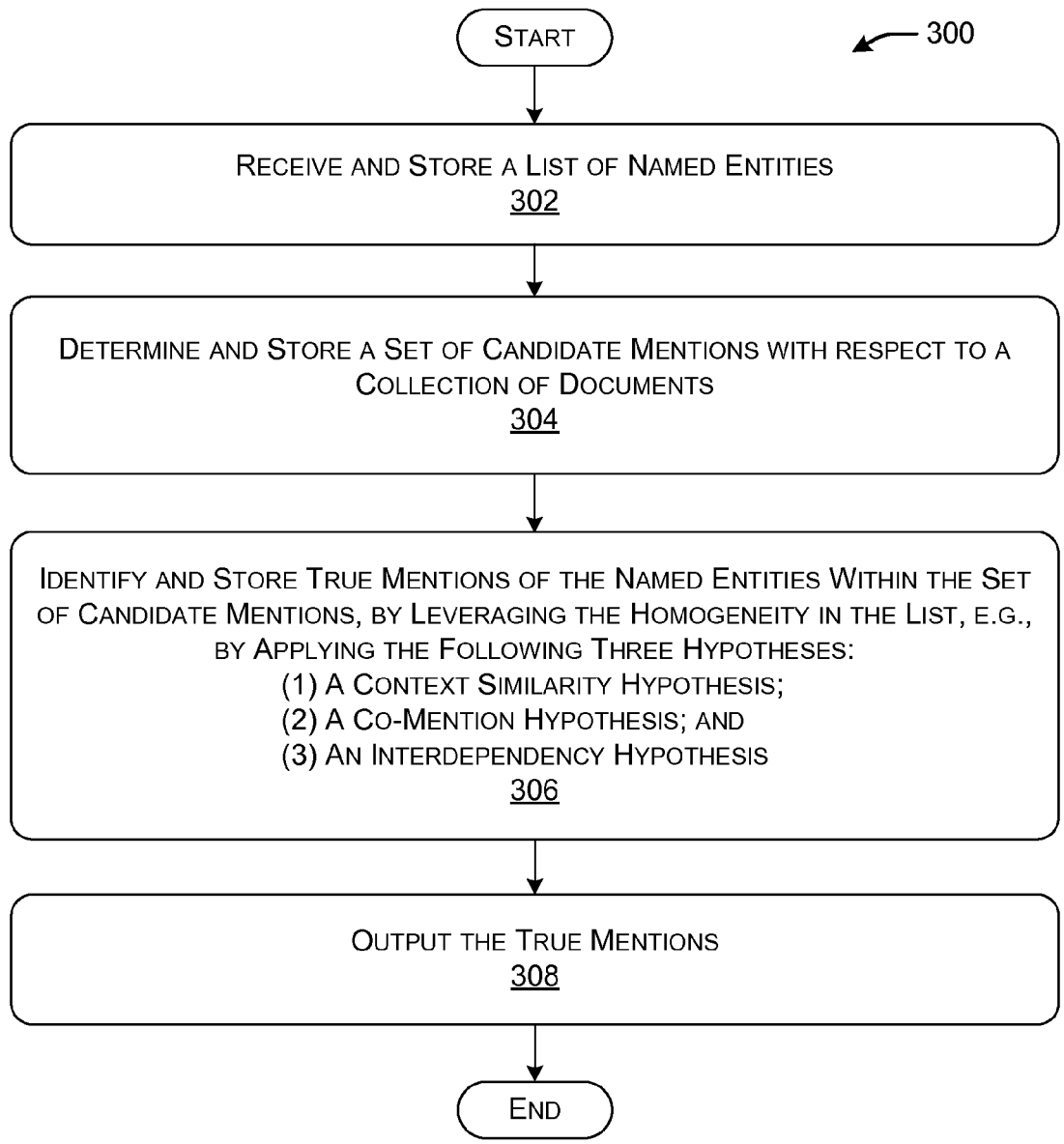
FIG. 3 is a flowchart that describes, in a high-level form, one manner of operation of the TDS of FIG. 2.

FIG. 3 shows a procedure 300 that describes, in a high-level form, one manner of operation of the TDS 200 of FIG. 2. Later sections will provide additional information regarding the operations performed in this flowchart.

In block 302, the TDS 200 receives and stores a list of named entities pertaining to any subject matter domain. In block 304, the TDS 200 determines and stores a set of candidate mentions. Each candidate mention corresponds to an occurrence of at least one string associated with a named entity in a document. In block 306, the TDS 200 identifies and stores true mentions of the named entities within the set of documents. It performs this task by leveraging the homogeneity in the list of named entities. More specifically, the TDS 200 can determine the true mentions by applying the three hypotheses described above: (a) the context similarity hypothesis; (b) the co-mention hypothesis; and (c) the interdependence hypothesis. In block 308, the TDS 200 outputs the true mentions determined in block 308.

Figure 4:
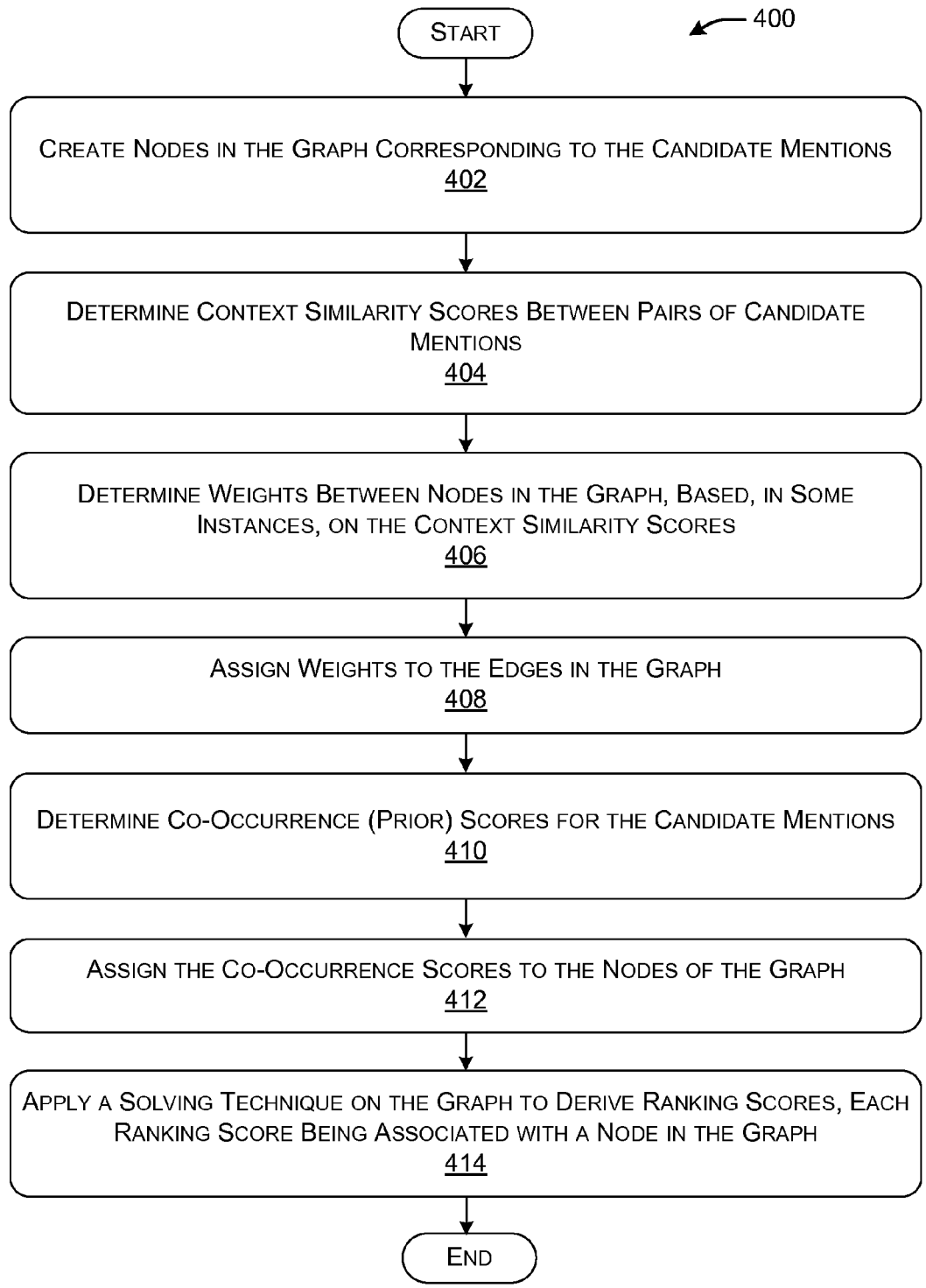
FIG. 4 is a flowchart that describes, in greater detail, one manner of operation of the TDS of FIG. 2.

FIG. 4 is a procedure 400 that describes additional detail regarding block 306 of FIG. 3. Again, later sections will provide additional information regarding the operations performed in this flowchart. The TDS 200 need not perform the operations in procedure 400 in the order listed in FIG. 4.

In block 402, the TDS 200 creates nodes in the graph corresponding to the candidate mentions. In block 404, the TDS 200 determines context similarity scores between pairs of candidate mentions. In block 406, the TDS 200 determines weights between nodes in the graph, based, in part, on the context similarity scores provided in block 404. In block 408, the TDS 200 assigns the weights computed in block 406 to the edges of the graph. In block 410, the TDS 200 determines co-occurrence scores associated with the candidate mentions. In block 412, the TDS 200 assigns the co-occurrence scores to the nodes in the graph. In block 414, the TDS 200 applies a solving technique to derive ranking scores. Each ranking score is associated with a node in the graph.

B. Generating the Graph

Figure 5:
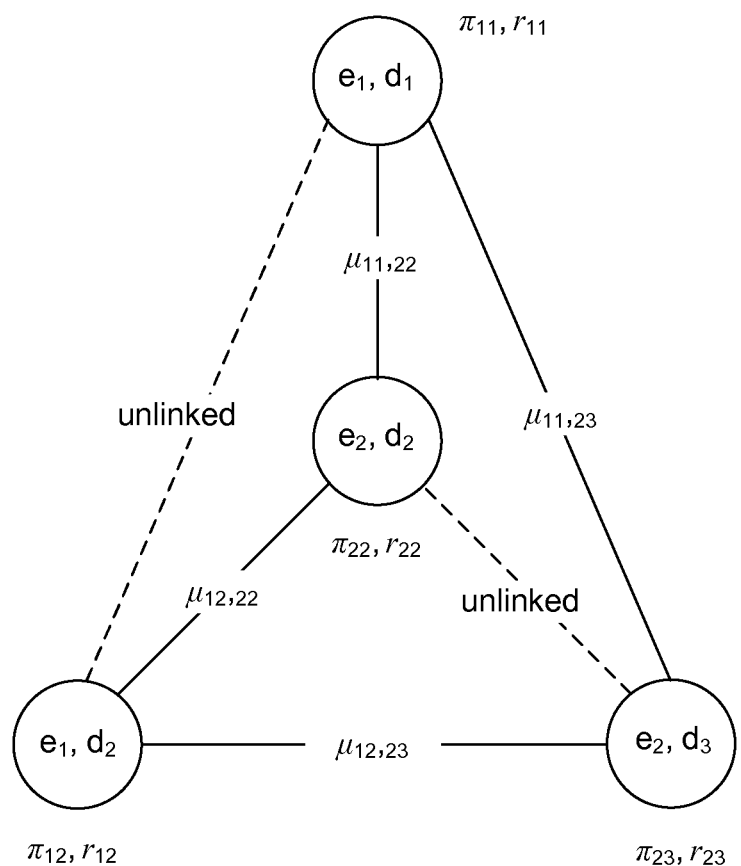
FIG. 5 is a sample of a graph that may be constructed by the TDS of FIG. 2.

FIG. 5 is a small sample of a graph that may be constructed by the TDS 200 of FIG. 2. This graph corresponds to some of the relationships depicted in FIG. 1. That is the graph shows the relationships between two entities ($e_1$ and $e_2$) and three documents ($d_1$, $d_2$, and $d_3$); for simplicity, the graph omits the relationship between $e_3$ and $d_4$.

The graph construction module 226 assigns a node to each candidate mention. Generally, a node indicates that there is at least one occurrence of a string associated with a named entity $e_i$ in a document $d_j$. That is, although a document may contain multiple occurrences of a string for a particular named entity, to simplify analysis, the graph construction module 226 only assigns a single representative node to the pairing of entity $e_i$ and document $d_j$. Hence, a first node ($e_1$, $d_1$) represents at last one occurrence of a string associated with $e_1$ in $d_1$. A second node ($e_1$, $d_2$) represents at least one occurrence of a string associated with $e_1$ in $d_2$. A third node ($e_2$, $d_2$) represents at least one occurrence of a string associated with $e_2$ in $d_2$. A fourth node ($e_2$, $d_3$) represents at last one occurrence of a string associated with $e_2$ in $d_3$.

To simplify analysis, the graph construction module 226 assumes that the plural occurrences of a string in a document (if present) refer to the same concept. That is, a document which mentions "apple" twice is unlikely to refer to "apple" both in the context of a computer company and in the context of a fruit. More specifically, while this case is possible in relatively rare circumstances, the graph construction module 226 ignores it to simplify its analysis.

The graph construction module 226 also assigns raw co-occurrence scores to each node. As summarized above, a co-occurrence score describes an extent to which a document associated with a candidate mention contains strings associated with two or more named entities. More specifically, the graph associates raw co-occurrence scores $\pi_{11}$, $\pi_{12}$, $\pi_{22}$, and $\pi_{23}$ with nodes ($e_1$, $d_1$), ($e_1$, $d_2$), ($e_2$, $d_2$), and ($e_2$, $d_3$), respectively. As will be clarified below, the graph construction module 226 then normalizes the raw co-occurrence scores to derive a final co-occurrence score vector p, comprising individual scores $p_{11}$, $p_{12}$, $p_{22}$, and $p_{23}$ (not shown in FIG. 5).

The graph construction module 226 also establishes edges which connect each respective pair of candidate mentions. That is, an edge connects a first candidate mention ($e_i$, $d_j$) to a second candidate mention ($e_{i'}$, $d_{j'}$). The graph construction module 226 then assigns a raw context similarity score $\mu_{ij,i'j'}$ to that edge. As described above, the raw context similarity score describes an extent to which the context of the candidate mention ($e_i$, $d_j$) is similar to the context of the candidate mention ($e_{i'}$, $d_{j'}$).

Note, however, that the graph construction module 226 does not assign a raw context similarity score to any edge that connects nodes associated with the same entity, e.g., in which $e_i = e_{i'}$. The graph construction module 226 omits a score in this circumstance to address a biasing effect that may be produced by a large number of false mentions associated with a particular named entity. For example, consider the example in which a list of named entities contains the names of well-known computer scientists, one of which is "Michael Jordan." The set of candidate mentions may include a few candidate mentions for the scientist "Michael Jordan," but it may also include a relatively large number of candidate mentions for the basketball player "Michael Jordan." Based on the interdependency hypothesis, this large number of false mentions can spread through the graph and bias the calculation of ranking scores. The graph construction module 226 can prevent this from happening by omitting the raw context similarity scores for links between candidate mentions that pertain to the same entity. In doing so, the TDS 200 is leveraging the observation that it is more reliable for a candidate mention to be deemed true if it has similar context with mentions of many different entities, rather than with many mentions of the same named entity.

The graph construction module 226 also assigns weights $w_{11,12}$, $w_{11,22}$, $w_{11,23}$, $w_{12,23}$, $w_{22,12}$, and $w_{22,23}$, (not shown in FIG. 5) to respective edges. The weights collectively form a weight vector w. In some cases, a weight includes a part that is based on a corresponding raw context similarity score. Each weight also addresses normalization and smoothing considerations. Section E provides additional information regarding the computation of weights.

Finally, the graph construction module 226 assigns a to-be-determined ranking score $r_{ij}$ to each node. As said, once the graph has been "solved," the ranking score $r_{ij}$ will provide a measure which reflects an extent to which the candidate mention associated with the node is a true mention.

In one illustrative implementation, the ranking score $r_{ij}$ for entity $e_i$ and document $d_j$ is given by:

$$r_{ij} = \lambda p_{ij} + (1-\lambda) \sum_{i',j'} w_{ij,i'j'} r_{i'j'}, \quad (1)$$

where $\lambda$ is a constant between 0 and 1, $p_{ij}$ is based on a co-occurrence score associated with the candidate mention ($e_i$, $d_j$), entity $e_{i'}$ and document $d_{j'}$ correspond to another candidate mention ($e_{i'}, d_{j'}$), $w_{ij,i'j'}$ is a weight assigned to an edge between candidate mention ($e_i$, $d_j$) and candidate mention ($e_{i'}, d_{j'}$), and $r_{i'j'}$ is a ranking score associated with the candidate mention ($e_{i'}, d_{j'}$). The weight $w_{ij,i'j'}$ will depend on the raw context similarity score $\mu_{ij,i'j'}$, so long as $e_i \neq e_{i'}$. Collectively, the ranking scores form a vector r.

The above equation includes component parts which leverage the three hypotheses described in Section A. Namely, the context similarity hypothesis is addressed by the presence of the weight vector w, the co-occurrence hypothesis is addressed by the presence of the co-occurrence vector p, and the interdependency hypothesis is addressed by the product of w and r.

Also note that Equation (1) has two parts. A first part depends on the prior likelihood information expressed by the co-occurrence vector p. The second part takes into account the influence of related candidate mentions. The constant λ determines the importance of the first part of the equation relative to the second part.

C. Computing Context Similarity Scores

The raw context similarity score $\mu_{ij,i'j'}$ measures the degree to which the context for candidate mention $(e_i, d_j)$ agrees with the context for candidate mention $(e_{i'}, d_{j'})$. The context similarity determination module (CSDM) 214 can calculate this score in various ways. First, the CSDM 214 can define the context of each candidate mention as the z words preceding a string associated with a named entity in question, and the z words following the string. For example, in document $d_1$ of FIG. 1, the context may include the prior phrase "The new operating system of," and the subsequent phrase, "boasts a graphical user interface." Other implementations can define the context in other ways, such as by defining the context as an entire sentence, entire paragraph, entire record, or entire document in which a string associated with a named entity appears.

Recall that a single document may include plural occurrences of a string associated with a named entity. For example, the document $d_2$ of FIG. 2 includes two occurrences of the string "Microship." In one implementation, the CSDM 214 computes the context similarity score by considering each pairing of the $x^{th}$ occurrence of a string $s_i$ for entity $e_i$ in document $d_j$ with the $y^{th}$ occurrence of a string $s_{i'}$ for entity $e_{i'}$ in document $d_{j'}$. For example, if there are three occurrences of string $s_i$ in document $d_j$ and three occurrences of string $s_{i'}$ in document $d_{j'}$, the CSDM 214 will perform nine separate context comparisons. Each context comparison may be denoted as $\theta_{ijx,i'j'y}$.

In one case, $\mu_{ij,i'j'}$ comprises the average of the individual context comparisons:

$$\mu_{ij,i'j'} = \underset{x,y}{\text{average}}\, \theta_{ijx,i'j'y}. \qquad (2)$$

In alternative cases, the CSDM 214 can compute $\mu_{ij,i'j'}$ based on a min function, max function, median function, or any combination of these functions.

The CSDM 214 can likewise use different measures to compute each individual context comparison $\theta_{ijx,i'j'y}$. In one case, the CSDM 214 can form term-frequency inverse-document-frequency (tf-idf) vectors associated with the two contexts for comparison. The CSDM 214 can then compare the two vectors using the cosine similarity function. The cosine similarity function may be expressed as:

$$\text{similarity measure} = \frac{X \cdot Y}{\|X\|\|Y\|}, \qquad (3)$$

where X and Y represent the input vectors to be compared. More specifically, the CSDM 214 can normalize the input vectors (associated with the contexts), so that each vector has a length 1. After normalization, the CSDM 214 can remove noisy and indiscriminative words by respectively omitting words with very low document frequency and very high document frequency. Normalization allows the CSDM 214 to compute the similarity (using the cosine similarity technique) by simply performing a dot product.

D. Computing Co-Occurrence Scores

As stated above, each raw co-occurrence score $\pi_{ij}$ measures the extent to which a document $d_j$ associated with the candidate mention $(e_i, d_j)$ contains strings associated with two or more named entities in the list. In one approach, the co-occurrence module 222 can compute $\pi_{ij}$ by counting the number of different strings (associated with respective named entities) in an entire document $d_j$. In another approach, the co-occurrence module 222 can compute $\pi_{ij}$ by counting the different strings that appear in the context portions of the document $d_j$, rather than the entire document.

Once the vector π is computed, the normalized co-occurrence vector p can be obtained based on the computation: $p_{ij} = \pi_{ij}/\Sigma_{i,j}\pi_{ij}$. As noted above, the graph construction module 226 assigns the normalized co-occurrence scores $p_{ij}$ to the nodes in the graph.

E. Computing Weights

In one implementation, the weight determination module 218 computes the weights based on the following equations:

$$w_{i'j',ij} = \begin{cases} \dfrac{z_{ij}}{k}, & \text{if } i = i' \\[2pt] \dfrac{\mu_{i'j',ij}}{V_i Z} + \dfrac{z_{ij}}{k}, & \text{otherwise,} \end{cases} \qquad (4)$$

where:

$$z_{ij} = 1 - \frac{\Sigma_{i' \neq i}\Sigma_{j'}\mu_{i'j',ij}}{V_i Z}, \text{ and} \qquad (5)$$

$$Z = \max_{i,j} \frac{\Sigma_{i' \neq i}\Sigma_{j'}\mu_{i'j',ij}}{V_i}. \qquad (6)$$

In these equations, $V_i$ is the number of documents that have candidate mentions of $e_i$ in the document collection, and k is the total number of candidate mentions in the graph. In other words, $V_i = |\{d_j | (e_i, d_j) \in R\}|$, and $k = |R|$.

Note that, if $e_i \neq e_{i'}$, then the weighting term in Equation (4) has two components. The first part corresponds to a normalized context similarity score. The second component corresponds to a smoothing term. If $e_i = e_{i'}$, however, the weighting term only includes the smoothing term. This formalizes the notion set forth above, whereby the TDS 200 does not take into account the raw context similarity score between two nodes if $e_i = e_{i'}$. This prevents biasing that may occur in situations in which there are a large number of false mentions associated with a named entity.

As to the normalization performed by Equation (4), note that the denominator of the first component, $V_i Z$, has the effect limiting the total contribution from candidate mentions associated with an individual named entity. This normalizing operation is another way to reduce bias in the ranking operation.

As to the smoothing term, the TDS 200 may, in some cases, select only a short text window for context similarity computation. Because of this, the context similarity score between many pairs of candidate mentions could be zero or close to zero. The smoothing term performs smoothing of the propagation weight to address this issue.

More specifically, $z_{ij}$ and Z are constants used for smoothing. $Z_{ij}$ controls the weight of the smoothing term 1/k. It is negatively correlated with the overall context similarity of $(e_i, d_j)$ and other mentions. Z is a constant that represents the maximum overall context similarity of one mention with other mentions. If the overall context similarity of the one mention with other mentions is high (close to Z), the smoothing term will be small in order to avoid significantly deviating the final weight from the similarity score.

F. Solving the Graph

The relationship of Equation (1) can be rewritten as r=Mr, where r is the ranking score vector and M is a Markov matrix that is stochastic, irreducible, and aperiodic. Different known techniques can be used to solve this type of formulation, such as the power method.

More specifically, the power method entails iteratively solving the equation:

$$r_{m+1} = \frac{Mr_m}{\|Mr_m\|}. \qquad (7)$$

The iteration starts with an initial vector $r_0$. In one case, $r_0$ has a value of 0.0 for each $r_{ij}$. The iteration continues until the change in score becomes smaller than a specified threshold $\epsilon$. In one case, the computing functionality used to perform the iterative solving technique uses distributed parallel processing resources. These resources may be provided by local computing functionality and/or by remote computing functionality.

Consider the following simplified case, which modifies the example of FIG. 1 in the following manner. Assume that $(e_1, d_1)$ and $(e_2, d_3)$ are false mentions, and the other two mentions are true. Further assume that the context similarity score between true mentions is 0.8, and all others is 0.2. Further assume $\lambda=0$ (meaning that no entity co-mention prior is used). Under these conditions, Equation (1) becomes:

$$\begin{pmatrix} r_{11} \\ r_{12} \\ r_{22} \\ r_{23} \end{pmatrix} = \begin{pmatrix} 0.15 & 0.00 & 0.20 & 0.35 \\ 0.15 & 0.00 & 0.80 & 0.35 \\ 0.35 & 0.80 & 0.00 & 0.15 \\ 0.35 & 0.20 & 0.00 & 0.15 \end{pmatrix} \begin{pmatrix} r_{11} \\ r_{12} \\ r_{22} \\ r_{23} \end{pmatrix}.$$

The solution is $(r_{11}, r_{12}, r_{22}, r_{23})=(0.4, 1.0, 1.0, 0.4)$. Note that the scores have been normalized so that the largest score is 1.0.

G. Leveraging Additional Knowledge

In the above description, the TDS 200 computes the ranking score vector r without taking into consideration any additional information pertaining to the entities. Nevertheless, in some cases, additional information may be available for one or more of the entities in the list. The additional information can take various forms. For example, the additional information for an entity may correspond to a document of any type that imparts information regarding the entity $e_i$, such as an online encyclopedia article pertaining to the entity $e_i$. In another case, the additional information may correspond to attributes pertaining to the entity $e_i$ obtained from any source or combination of sources, such as an online catalog or a database. For example, consider a named entity that corresponds to the name of a book. The attributes for this entity may correspond to author name, publisher, publication date, genre, etc.

The additional information for an entity $e_i$ can be expressed as a reference document $a_i$. In the case that the additional information corresponds to a pre-existing source document, that source document serves as the reference document. In the case in which the additional information corresponds to a set of attributes, the TDS 200 can concatenate the attributes to form a pseudo-document; that pseudo-document then serves as the reference document.

Figure 6:
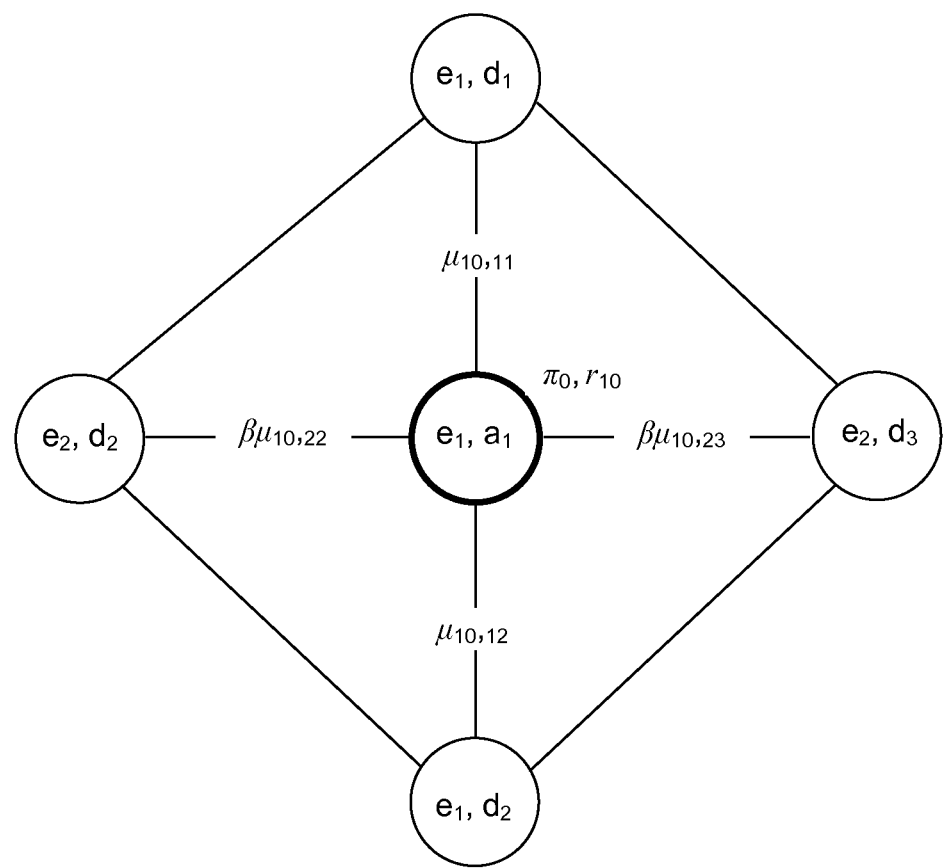
FIG. 6 is a sample of another graph that may be constructed by the targeted disambiguation system of FIG. 2; here, the graph includes at least one virtual node associated with additional information pertaining to a named entity.

The graph construction module 226 can then add a virtual node to the graph corresponding to the reference document $a_i$. For example, assume that a reference document $a_1$ exists for the first entity $e_1$ shown in FIG. 1. As shown in FIG. 6, the graph construction module 226 can add a virtual node $(e_1, a_1)$ to the graph. Further, the graph construction module 226 assigns a high prior score $\pi_0$ to the virtual node, indicative of the fact that the information imparted by this reference source is known to have strong relevance to the entity $e_1$.

Then, the graph construction module 226 links the virtual node to every other candidate mention in the graph. The graph construction module 226 then assigns a candidate-node-to-virtual-node score to each edge that links to the virtual node. In a first case, assume that the edge links nodes associated with the same entity, i.e., $e_i=e_{i'}$; here, the graph construction module 226 will use the raw context similarity score $\mu_{ij,i'j'}$ as the context-node-to-virtual-node score for the edge. In a second case, assume that the edge links nodes associated with different entities, i.e., $e_i \neq e_{i'}$; here, the graph construction module 226 will use $\beta\mu_{ij,i'j'}$ as the context-node-to-virtual-node score for the edge.

The adjustment parameter $\beta$ reflects an extent to which the reference document $a_1$ is generally applicable to all of the named entities in the list of named entities. For example, suppose that the reference document $a_1$ provides only idiosyncratic information about the company "Microship," e.g., pertaining to some unusual product that this company produces which is out-of-character with the typical products produced by this kind of company. In this case, the parameter $\beta$ would be low. The adjustment parameter $\beta$ therefore controls the manner in which the relevance of the reference document $a_1$ propagates through the graph. In one implementation, a human analyst can provide the parameter $\beta$ for each reference document. Alternatively, or in addition, the TDS 200 can use an automated mechanism to determine the parameter $\beta$, such as by using a trained classifier.

The graph construction module 226 also assigns a to-be-determined ranking score $r_{10}$ to the node associated with the reference document $a_1$. This node receives a ranking score to provide a vehicle for propagating its relevance through the graph, rather than to assign a final ranking score to the reference document $a_1$ (which is not of interest). More specifically, note that, by virtue of the interdependency hypothesis, the evidence established by the reference document can influence the ranking scores associated with candidate mentions that do not pertain to the reference document. The parameter $\beta$ helps prevent this influence from spreading to entities that are not related to the reference document.

Note that, so as not to unduly complicate the figure, FIG. 6 does not label the edges between pairs of candidate mentions with their raw context similarity scores. Further, FIG. 6 does not label the candidate mention nodes with their raw co-occurrence scores. Those omitted scores (which are explicitly shown in FIG. 5) nevertheless also apply to case of FIG. 6. The weights assigned to the edges in FIG. 6 are computed in the same manner described above, e.g., using Equations (4)-(6).

To simplify explanation, it was assumed above that there is, at most, one reference document per named entity. But the TDS 200 can also accommodate the case in which a single named entity has two or more separate reference documents. For instance, the graph construction module 226 can add a separate virtual node for each reference document associated with a named entity.

Figure 7:
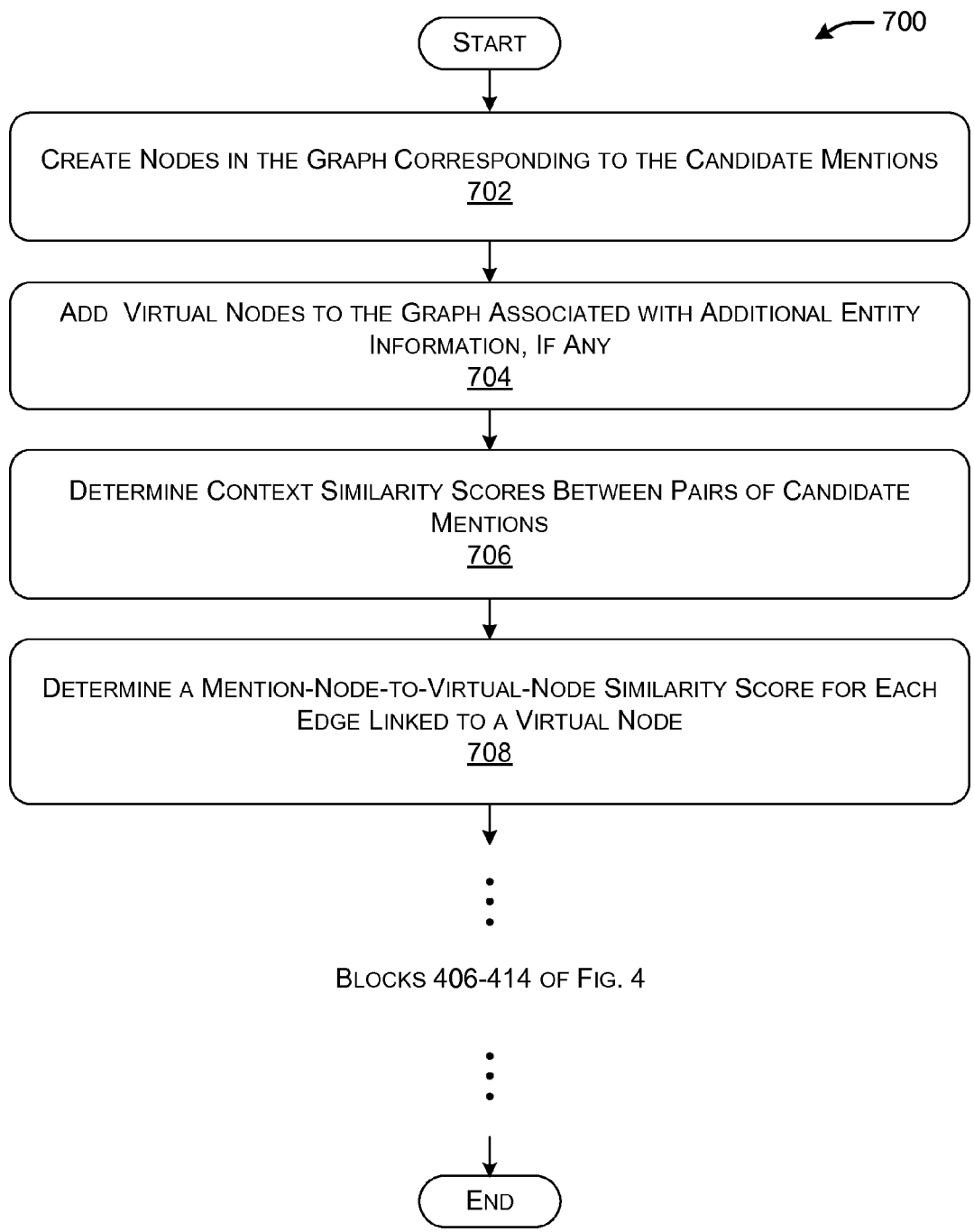
FIG. 7 is a flowchart that describes another manner of operation of the TDS of FIG. 2; in this case, the TDS takes into account additional information that is available regarding the named entities.

FIG. 7 shows a procedure which summarizes the manner in which the TDS 200 can take into account the presence of additional information. In block 702, the TDS 200 creates nodes in the graph corresponding to the candidate mentions (this is the same as block 402 of FIG. 4). In block 704, the TDS 200 adds one or more virtual nodes to the graph associated with additional information regarding the named entities, if it exists. In block 706, the TDS 200 determines context similarity scores between pairs of candidate mentions (this is the same as block 404 of FIG. 4). In block 708, the TDS 200 determines mention-node-to-virtual-node similarity scores between respective pairs of mentions nodes and virtual nodes. The remainder of the procedure 600 conforms to blocks 406-414 of FIG. 4.

The TDS 200 can incorporate additional information into its analysis in additional ways. For example, assume that a-priori knowledge exists regarding the similarity of two or more named entities in the list of named entities. For example, assume that two or more entities pertain to a subcategory within the general subject matter domain of the list. The TDS 200 can address this situation by assigning an entity-to-entity similarity score $\delta_{ii'}$ between each entity $e_i$ and entity $e_{i'}$ that reflects the degree of similarity between the entities. The TDS 200 can then assign a modified raw context similarity score to each edge corresponding to $\delta_{ii'}\mu_{ij,i'j'}$. This has the effect of reducing the propagation of relevancy over an edge if the two respective entities that are associated with the edge are known to be dissimilar.

H. Illustrative Computing Functionality

Figure 8:
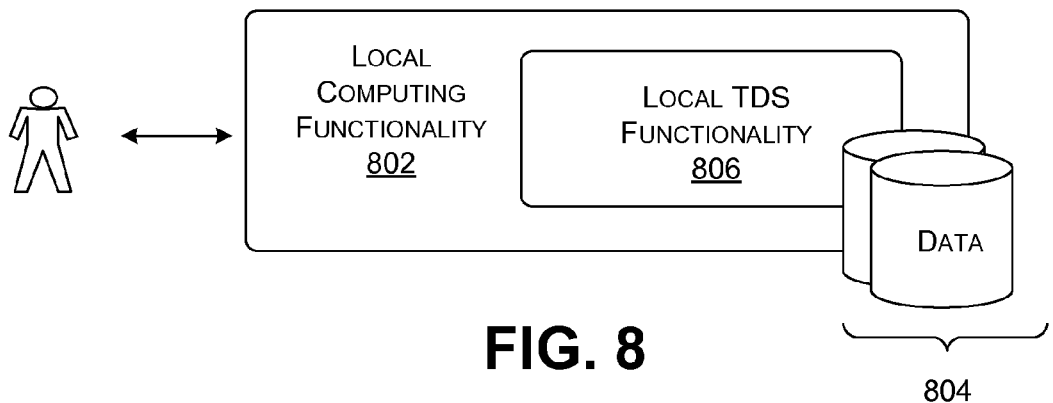
FIG. 8 depicts a first computer-related implementation of the functionality shown in the foregoing drawings.

FIG. 8 shows a first physical implementation of the functionality shown in the foregoing drawings. In this case, all aspects of the TDS 200 described above are implemented by stand-alone local computing functionality 802, in conjunction with one or more data stores 804. FIG. 8 illustrates this point by indicating that the local computing functionality 802 includes local TDS functionality 806.

For example, the local TDS functionality 806 may correspond to a standalone utility, or a function that is integrated with some other application. In this case, the user may use the local computing functionality 802 to submit a list of named entities to the local TDS functionality 806. The local TDS functionality 806 can return an indication of true mentions of the named entities in the list. The local TDS functionality 806 can mine these true mentions from any local and/or remote repository(ies) of documents.

The local computing functionality 802 can correspond to any type of computing device, such as a personal computing device, a computer work station, a lap top computing device, a netbook-type computing device, a tablet computing device, a booklet computing device, a mobile telephone device, a personal digital assistant device, a game console device, a portable game device, a set-top box device, and so on, or any combination thereof.

Figure 9:
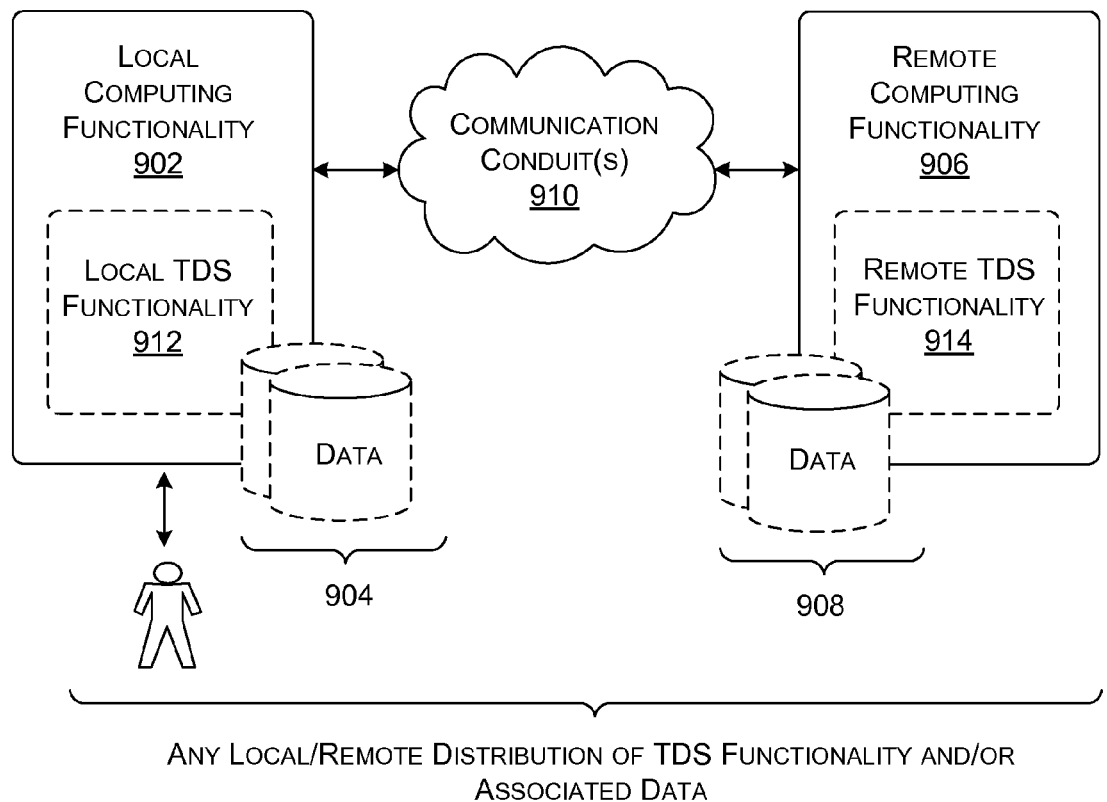
FIG. 9 depicts a second computer-related implementation of the functionality shown in the foregoing drawings.

FIG. 9 shows a second physical implementation of the functionality shown in the foregoing drawings. In this case, local computing functionality 902 (and associated data stores 904) are coupled to the remote computing functionality 906 (and associated data stores 908) via a communication conduit 910. Here, any aspect of the TDS 200 can be distributed between the local and remote computing functionalities (902, 906) in any manner. FIG. 9 conveys this point by showing some TDS functionality 912 provided by the local computing functionality 902 and some TDS functionality 914 provided by the remote computing functionality 906.

In one case, for instance, all of the processing performed by the TDS 200 can be implemented by the remote TDS functionality 914, e.g., as a service available to various end users, enterprises, etc. That is, the user may use the local computing functionality 902 to submit a list of named entities to the remote TDS functionality 914. The remote TDS functionality 914 can return an indication of true mentions of the named entities in the list. The remote TDS functionality 914 can mine these true mentions from any local or remote repository(ies) of documents.

The local computing functionality 902 of FIG. 9 can be implemented using any of the computing devices mentioned above with respect to FIG. 8. The remote computing functionality 906 can be implemented by one or more server computing devices. The communication conduit 910 can be implemented by a local area network, a wide area network (e.g., the Internet), or combination thereof.

Figure 10:
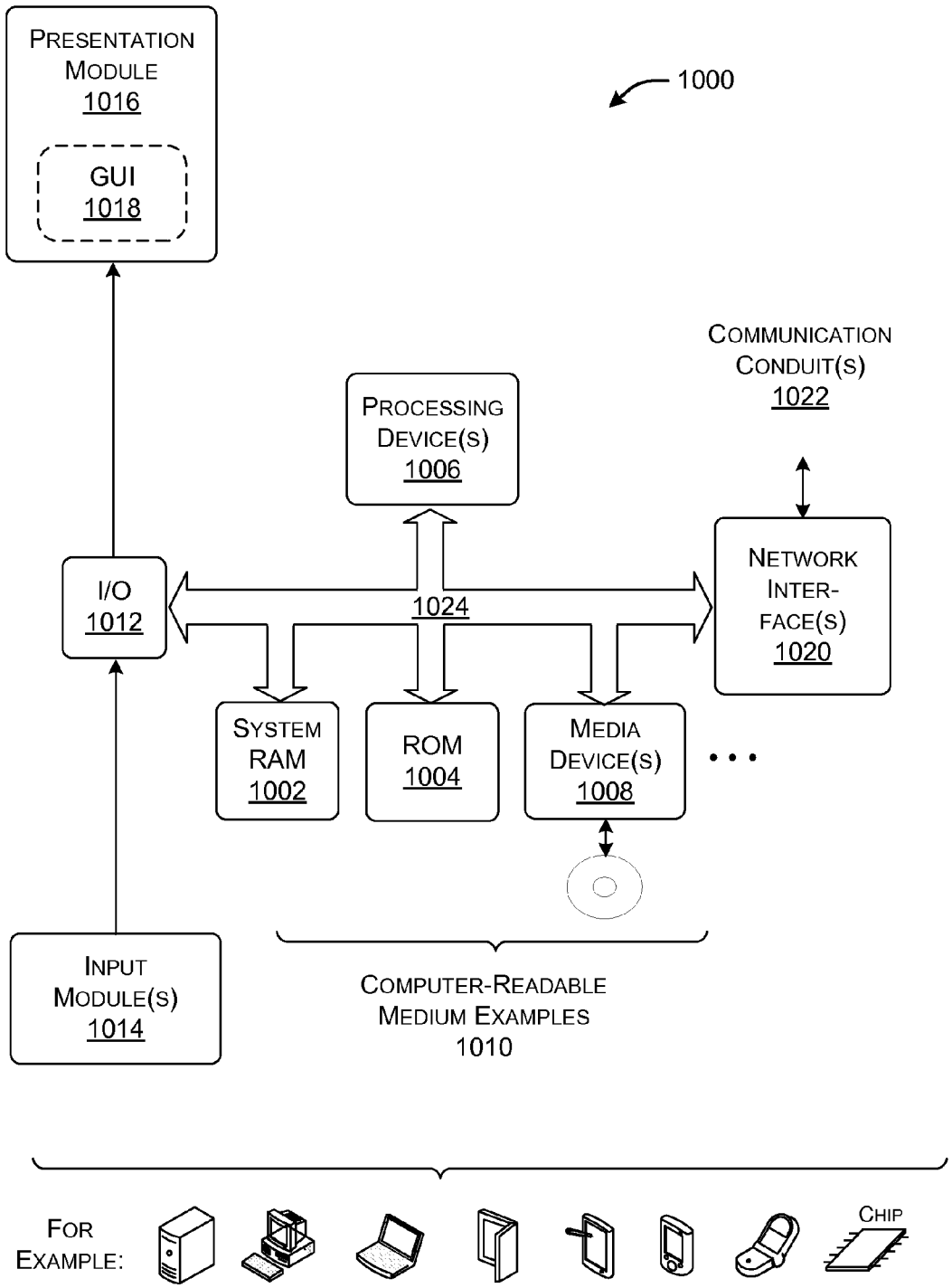
FIG. 10 shows a yet more detailed computer-related implementation of the functionality shown in the foregoing drawings.

FIG. 10 sets forth a yet more detailed depiction of computing functionality 1000 that can be used to implement any aspect of the functions described above. For example, the computing functionality 1000 can be used to implement any aspect of the TDS 200 of FIG. 2, e.g., as provided by the embodiment of FIG. 8, the embodiment of FIG. 9, or any other embodiment. In all cases, the computing functionality 1000 represents one or more physical and tangible processing mechanisms.

The computing functionality 1000 can include volatile and non-volatile memory, such as RAM 1002 and ROM 1004, as well as one or more processing devices 1006 (e.g., one or more CPUs, and/or one or more GPUs, etc.). The computing functionality 1000 also optionally includes various media devices 1008, such as a hard disk module, an optical disk module, and so forth. The computing functionality 1000 can perform various operations identified above when the processing device(s) 1006 executes instructions that are maintained by memory (e.g., RAM 1002, ROM 1004, or elsewhere).

More generally, instructions and other information can be stored on any computer readable medium 1010, including, but not limited to, static memory storage devices, magnetic storage devices, optical storage devices, and so on. The term computer readable medium also encompasses plural storage devices. In all cases, the computer readable medium 1010 represents some form of physical and tangible entity.

The computing functionality 1000 also includes an input/output module 1012 for receiving various inputs (via input modules 1014), and for providing various outputs (via output modules). One particular output mechanism may include a presentation module 1016 and an associated graphical user interface (GUI) 1018. The computing functionality 1000 can also include one or more network interfaces 1020 for exchanging data with other devices via one or more communication conduits 1022. One or more communication buses 1024 communicatively couple the above-described components together.

The communication conduit(s) 1022 can be implemented in any manner, e.g., by a local area network, a wide area network (e.g., the Internet), etc., or any combination thereof. The communication conduit(s) 1022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, the computing functionality 1000 can be implemented as one or more of: Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computer processing devices, the method comprising:
   receiving and storing a list of multiple different named entities, the multiple different named entities homogenously pertaining to a particular subject matter domain;
   determining and storing a set of candidate mentions of the multiple different named entities, each candidate mention being an occurrence of a corresponding named entity in the list of multiple different named entities, the set of candidate mentions including true mentions and false mentions occurring in a collection of documents;
   identifying particular candidate mentions as the true mentions within the set of candidate mentions by leveraging homogeneity in the list of multiple different named entities, each true mention corresponding to a valid occurrence of an individual named entity in the collection of documents, the identifying including assigning scores to individual candidate mentions of the set of candidate mentions and identifying the particular candidate mentions as the true mentions using the scores; and
   outputting the true mentions.

2. The method of claim 1, wherein the method identifies the true mentions without a-priori knowledge of the particular subject matter domain associated with the list of multiple different named entities.

3. The method of claim 1, wherein the set of candidate mentions contains:
   at least one occurrence of an individual named entity from the list that is an individual true mention; and
   at least one false mention that is a homograph of the individual named entity.

4. The method of claim 1, wherein the scores include context similarity scores, and said identifying comprises:
   identifying contexts of the individual candidate mentions of the set of candidate mentions, the contexts corresponding to at least two distinct named entities in the list;
   differentiating some contexts that are more similar and other contexts that are less similar;
   assigning the context similarity scores to the individual candidate mentions based on the differentiating; and
   identifying the particular candidate mentions as the true mentions based on the context similarity scores.

5. The method of claim 1, wherein the scores include co-occurrence scores, and said identifying comprises:
   identifying strings associated with plural respective named entities in the list of multiple different named entities that appear as the individual candidate mentions in a particular document;
   assigning the co-occurrence scores to the individual candidate mentions based on an extent to which the particular document includes two or more of the strings; and
   identifying the particular candidate mentions associated with the two or more of the strings as some of the true mentions based on the co-occurrence scores.

6. The method of claim 1, wherein said identifying comprises:
   ascertaining that a first individual candidate mention has a similar context with a first individual true mention; and
   in response to the ascertaining, identifying the first individual candidate mention as a second individual true mention.

7. The method of claim 1, wherein said identifying also uses counterpart reference information pertaining to at least one named entity in the list of multiple different named entities to identify the true mentions.

8. The method of claim 1, wherein said identifying comprises:
   constructing a graph, where:
      each node in the graph relates to an associated candidate mention of a particular named entity from the list of multiple different named entities in a particular document,
      each node in the graph is associated with a co-occurrence score that identifies an extent to which the particular document includes strings associated with plural respective named entities from the list of multiple different named entities,
      each edge in the graph connects one node, associated with one of the candidate mentions, with another node, associated with another one of the candidate mentions, and
      at least some edges are associated with context similarity scores that identify contextual similarity between corresponding candidate mentions; and
   determining ranking scores, each ranking score identifying an extent to which the associated candidate mention associated with each node is considered one of the true mentions.

9. The method of claim 8, wherein a ranking score $r_{i,j}$ associated with a candidate mention $(e_i, d_j)$ of entity $e_i$ in document $d_j$ is given by:

$$r_{i,j} = \lambda p_{ij} + (1-\lambda) \sum_{i',j'} w_{ij,i'j'} r_{i'j'},$$

where $\lambda$ is a constant,
$p_{i,j}$ is based on a particular co-occurrence score associated with the candidate mention $(e_i, d_j)$,
entity $e_{i'}$ and document $d_{j'}$ correspond to another candidate mention $(e_{i'}, d_{j'})$, $w_{ij,i'j'}$ is a weight assigned to an edge between the candidate mention ($e_i$, $d_j$) and the another candidate mention ($e_{i'}$, $d_{j'}$), and $r_{i'j'}$ is another ranking score associated with the another candidate mention ($e_{i'}$, $d_{j'}$).

10. The method of claim 8, further comprising omitting consideration of a particular context similarity score between a first candidate mention ($e_i$, $d_j$), associated with an entity $e_i$ in document $d_j$, and a second candidate mention ($e_{i'}$, $d_{j'}$), associated with an entity $e_{i'}$ and document $d_{j'}$, providing that $e_i = e_{i'}$.

11. The method of claim 8, further comprising:
creating at least one virtual node associated with an entity $e_i$, the at least one virtual node corresponding to counterpart reference information about the entity $e_i$; and
linking the at least one virtual node to the graph.

12. The method of claim 11, further comprising associating a mention-node-to-virtual-node similarity score to individual edges between the at least one virtual node and a node corresponding to a candidate mention ($e_{i'}$, $d_{j'}$), associated with entity $e_{i'}$ and document $d_{j'}$,
the mention-node-to-virtual-node similarity score being an associated unmodified context similarity score $\mu_{ij,i'j'}$, providing that $e_i = e_{i'}$,
the mention-node-to-virtual-node similarity score being an associated context similarity $\mu_{ij,i'j'}$ score modified by an adjustment parameter $\beta$, providing that $e_i \neq e_{i'}$, and
wherein the adjustment parameter $\beta$ describes another extent to which the counterpart reference information applies to the particular subject matter domain.

13. A hardware computer readable storage medium storing computer readable instructions, the computer readable instructions providing a targeted disambiguation system when executed by one or more processing devices, the computer readable instructions comprising:
logic configured to receive and store a list of multiple different named entities, the multiple different named entities homogenously pertaining to a particular subject matter domain;
logic configured to determine and store a set of candidate mentions, each candidate mention corresponding to an occurrence, in a collection of documents, of an individual string that represents a corresponding named entity in the list of multiple different named entities;
logic configured to identify contexts of the candidate mentions in the collection of documents;
logic configured to determine context similarity scores between pairs of the candidate mentions;
logic configured to determine co-occurrence scores for the candidate mentions, each co-occurrence score identifying an extent to which a particular document includes strings representing plural respective named entities from the list of multiple different named entities; and
logic configured to derive ranking scores, each ranking score identifying an extent to which a corresponding candidate mention is considered a true mention corresponding to a valid occurrence and meaning of a particular named entity in the collection of documents.

14. The hardware computer readable storage medium of claim 13, the computer readable instructions further comprising:
logic configured to create nodes in a graph corresponding to the candidate mentions;
logic configured to determine weights between the nodes in the graph based, in part, on the context similarity scores;
logic configured to assign the weights to edges in the graph;
logic configured to assign the co-occurrence scores to the nodes in the graph; and
logic configured to derive the ranking scores by solving the graph, the ranking scores being associated with the nodes in the graph.

15. The hardware computer readable storage medium of claim 14, the computer readable instructions further comprising:
logic configured to create at least one virtual node, the at least one virtual node associated with an entity $e_i$, the at least one virtual node conveying counterpart reference information about the entity $e_i$; and
logic configured to link the at least one virtual node to the graph.

16. The hardware computer readable storage medium of claim 15, the computer readable instructions further comprising logic configured to associate a mention-node-to-virtual-node similarity score to each edge between the at least one virtual node and a node corresponding to a candidate mention ($e_{i'}$, $d_{j'}$), associated with entity $e_{i'}$ and document $d_{j'}$,
the mention-node-to-virtual-node similarity score being an associated unmodified context similarity score $\mu_{ij,i'j'}$, providing that $e_i = e_{i'}$,
the mention-node-to-virtual-node similarity score being an associated context similarity score $\mu_{ij,i'j'}$, modified by an adjustment parameter $\beta$, providing that $e_i \neq e_{i'}$, and
where the adjustment parameter $\beta$ describes an extent to which the counterpart reference information applies to the particular subject matter domain.

17. A system comprising:
a processing device; and
a storage device storing computer-executable instructions which, when executed by the processing device, cause the processing device to:
receive and store a list of multiple different named entities, the multiple different named entities in the list pertaining to a particular subject matter domain,
determine and store a set of candidate mentions, each candidate mention being a string representing a corresponding named entity in the list of multiple different named entities, the set of candidate mentions including true mentions and false mentions occurring in a collection of documents, the false mentions corresponding to different meanings of the multiple different named entities that do not pertain to the particular subject matter domain,
assign scores to individual candidate mentions of the set of candidate mentions, and
distinguish between the true mentions and the false mentions within the set of candidate mentions based on the scores.

18. The system of claim 17, wherein the instructions further cause the processing device to assign the scores based at least in part on context similarity between contexts of particular candidate mentions corresponding to at least two distinct named entities in the list.

19. The system of claim 17, wherein the instructions further cause the processing device to assign the scores based at least in part on co-occurrence of two or more strings representing plural respective named entities in the list of multiple different named entities, the two or more strings appearing in a particular document.

20. The system of claim 17, wherein the instructions further cause the processing device to assign the scores based at least in part on a particular candidate mention having a similar context with one or more of the true mentions.

* * * * *